United States Patent
Kurase et al.

(10) Patent No.: US 11,736,631 B2
(45) Date of Patent: Aug. 22, 2023

(54) PRINTER-EQUIPPED DIGITAL CAMERA AND DISPLAYING CONTROL METHOD THEREOF

(71) Applicant: FUJIFILM Corporation, Tokyo (JP)

(72) Inventors: Hiroyuki Kurase, Tokyo (JP); Tsuneo Sato, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 17/189,751

(22) Filed: Mar. 2, 2021

(65) Prior Publication Data
US 2021/0185184 A1 Jun. 17, 2021

Related U.S. Application Data

(63) Continuation of application No. PCT/JP2019/035618, filed on Sep. 11, 2019.

(30) Foreign Application Priority Data

Sep. 13, 2018 (JP) ................................. 2018-171717

(51) Int. Cl.
*H04N 1/00* (2006.01)
*B41J 3/44* (2006.01)
(Continued)

(52) U.S. Cl.
CPC .......... *H04N 1/00278* (2013.01); *B41J 3/445* (2013.01); *G09G 3/3208* (2013.01);
(Continued)

(58) Field of Classification Search
CPC ........... H04N 1/00278; H04N 1/00411; H04N 5/2257; H04N 2201/0082; H04N 5/232;
(Continued)

(56) References Cited

U.S. PATENT DOCUMENTS

5,032,911 A  7/1991 Takimoto
5,909,248 A * 6/1999 Stephenson .......... H04N 1/2112
                                                     348/207.99
(Continued)

FOREIGN PATENT DOCUMENTS

CN   1276882 A    12/2000
JP   2000-196980 A   7/2000
(Continued)

OTHER PUBLICATIONS

An Office Action mailed by China National Intellectual Property Administration dated Oct. 9, 2021, which corresponds to Chinese Patent Application No. 201980060007.3 and is related to U.S. Appl. No. 17/189,751; with English language translation.
(Continued)

*Primary Examiner* — Abdelaaziz Tissire
(74) *Attorney, Agent, or Firm* — Studebaker & Brackett PC

(57) ABSTRACT

A printer-equipped digital camera and a displaying control method thereof capable of printing a high quality image and reducing a power load are provided. A printer-equipped digital camera 1 includes a film loading chamber 50 in which an instant film pack 100 is loaded, an exposure display 56, a louver plate 62 that is included on a displaying surface of the exposure display 56, an imaging lens 12, an image sensor 42, and an image displaying display 16, in which an image is recorded on the instant film 110 by displaying the image on the exposure display 56. Displaying of the image displaying display 16 is switched OFF while the image is displayed on the exposure display 56.

22 Claims, 19 Drawing Sheets

(51) Int. Cl.
*G09G 3/3208* (2016.01)
*H04N 23/57* (2023.01)

(52) U.S. Cl.
CPC ........ *H04N 1/00411* (2013.01); *H04N 23/57* (2023.01); *G09G 2320/0626* (2013.01); *G09G 2330/027* (2013.01); *H04N 2201/0082* (2013.01)

(58) Field of Classification Search
CPC ........ H04N 23/57; H04N 23/60; B41J 3/445; G09G 3/3208; G09G 2320/0626; G09G 2330/027; G09G 3/3406; G09G 2330/021; G03B 17/18; G03B 17/52
See application file for complete search history.

(56) References Cited

U.S. PATENT DOCUMENTS

| | | | | |
|---|---|---|---|---|
| 6,812,966 | B1 * | 11/2004 | Nakazawa | H04N 1/0044 348/333.01 |
| 6,963,359 | B1 | 11/2005 | Aosaki et al. | |
| 6,999,113 | B1 | 2/2006 | Omura | |
| 2001/0030692 | A1 * | 10/2001 | Yoneda | H04N 1/2112 348/207.99 |
| 2002/0012532 | A1 * | 1/2002 | Sasaki | G03B 17/50 396/440 |
| 2002/0044198 | A1 * | 4/2002 | Miyazaki | B41J 3/445 347/248 |
| 2005/0179731 | A1 * | 8/2005 | Omura | H04N 1/2154 347/50 |

FOREIGN PATENT DOCUMENTS

| | | | | |
|---|---|---|---|---|
| JP | 2000-284370 | A | | 10/2000 |
| JP | 2000284370 | A * | | 10/2000 |
| JP | 2001-045342 | A | | 2/2001 |
| JP | 2001-092016 | A | | 4/2001 |
| JP | 2001-277591 | A | | 10/2001 |
| JP | 2001277591 | A * | | 10/2001 |
| JP | 2004109615 | A * | | 4/2004 |
| JP | 2016103666 | A * | | 6/2016 ............. G03B 17/02 |
| WO | 2014/141612 | A1 | | 9/2014 |

OTHER PUBLICATIONS

An Office Action mailed by China National Intellectual Property Administration dated Feb. 23, 2022, which corresponds to Chinese Patent Application No. 201980060007.3 and is related to U.S. Appl. No. 17/189,751; with English language translation.

International Search Report issued in PCT/JP2019/035618; dated Dec. 17, 2019.

International Preliminary Report on Patentability and Written Opinion issued in PCT/JP2019/035618; dated Mar. 9, 2021.

An Office Action; "Notice of Reasons for Refusal," mailed by the Japanese Patent Office dated Mar. 3, 2022, which corresponds to Japanese Patent Application No. 2020-546046 and is related to U.S. Appl. No. 17/189,751 with English language translation.

An Office Action mailed by the State Intellectual Property Office of People's Republic of China dated Jun. 17, 2022, which corresponds to Chinese Patent Application No. 201980060007.3 and is related to U.S. Appl. No. 17/189,751; with English language translation.

* cited by examiner

PRINTER-EQUIPPED DIGITAL CAMERA AND DISPLAYING CONTROL METHOD THEREOF

CROSS-REFERENCE TO RELATED APPLICATIONS

This application is a Continuation of PCT International Application No. PCT/JP2019/035618 filed on Sep. 11, 2019, which claims priority under 35 U.S.C § 119(a) to Japanese Patent Application No. 2018-171717 filed on Sep. 13, 2018. Each of the above application(s) is hereby expressly incorporated by reference, in its entirety, into the present application.

BACKGROUND OF THE INVENTION

1. Field of the Invention

The present invention relates to a printer-equipped digital camera and a displaying control method thereof and particularly, to a printer-equipped digital camera that prints an image using an instant film, and a displaying control method thereof.

2. Description of the Related Art

A printer-equipped digital camera that incorporates a printer in a camera body and can instantly print a captured image on a medium has been known.

JP2001-045342A discloses that a printer-equipped digital camera that prints an image using an instant film incorporates an exposure display in a camera body and exposes a surface of the instant film using the exposure display.

SUMMARY OF THE INVENTION

In a case where the surface of the instant film is exposed using the exposure display as in the printer-equipped digital camera disclosed in JP2001-045342A, light from each pixel of the display is diffused, thereby posing a defect of blurriness of the printed image.

An image checking display is usually comprised in the camera body of the digital camera. In a case where the exposure display is comprised in addition to the image checking display, a defect arises in that a power load is increased.

The present invention is conceived in view of such a matter, and an object thereof is to provide a printer-equipped digital camera and a displaying control method thereof capable of printing a high quality image and reducing a power load.

(1) A printer-equipped digital camera comprises an instant film pack loading unit in which an instant film pack including an exposure opening is loaded, a first displaying unit of which a displaying surface is arranged to face an exposure surface of an instant film in the instant film pack through the exposure opening with respect to the instant film pack loaded in the instant film pack loading unit, and that exposes the instant film by displaying an image, a light exit direction restriction member that is included on the displaying surface of the first displaying unit and restricts a light exit direction of light from each pixel of the first displaying unit to a constant range, an imaging unit that electronically captures a subject image, a second displaying unit that displays an image to an outside, and a displaying control unit that controls displaying of the first displaying unit and the second displaying unit, in which the displaying control unit switches OFF displaying of the second displaying unit while the instant film is exposed by displaying the image on the first displaying unit.

According to the present aspect, the instant film is exposed through the light exit direction restriction member. Accordingly, blurriness of an image to be recorded can be prevented, and a high quality image can be printed. In addition, displaying of the second displaying unit is switched OFF during exposure. Accordingly, a peak value of power can be reduced, and a power load can be reduced.

(2) In the printer-equipped digital camera of (1), each of the first displaying unit and the second displaying unit is configured with a liquid crystal display including a backlight, and the displaying control unit controls ON and OFF of displaying of the first displaying unit and the second displaying unit by controlling ON and OFF of the backlight of the liquid crystal display constituting each of the first displaying unit and the second displaying unit.

According to the present aspect, each of the first displaying unit and the second displaying unit is configured with the liquid crystal display including the backlight, and controlling ON and OFF of displaying is performed by switching the backlight ON and OFF. Accordingly, a control can be simplified.

(3) In the printer-equipped digital camera of (2), the displaying control unit displays the same image on the first displaying unit and the second displaying unit.

According to the present aspect, the same image is displayed on the first displaying unit and the second displaying unit. Accordingly, a displaying control can be simplified.

(4) In the printer-equipped digital camera of (2) or (3), the first displaying unit and the second displaying unit are connected to the same image output interface.

According to the present aspect, the first displaying unit and the second displaying unit are connected to the same image output interface. Accordingly, a configuration and a control can be simplified.

(5) In the printer-equipped digital camera of any one of (2) to (4), the displaying control unit switches ON the backlight of the liquid crystal display constituting the first displaying unit in a case of exposing the instant film, and switches ON the backlight of the liquid crystal display constituting the second displaying unit in a case of displaying the image on the second displaying unit.

According to the present aspect, the backlight of the liquid crystal display constituting the first displaying unit is switched ON in a case of exposing the instant film. The backlight of the liquid crystal display constituting the second displaying unit is switched ON in a case of displaying the image on the second displaying unit.

(6) In the printer-equipped digital camera of any one of (2) to (5), the backlight of the liquid crystal display constituting each of the first displaying unit and the second displaying unit includes a white light source and a light guide plate.

According to the present aspect, the backlight of the liquid crystal display constituting each of the first displaying unit and the second displaying unit is configured with the white light source and the light guide plate.

(7) In the printer-equipped digital camera of any one of (1) to (6), the first displaying unit and the second displaying unit are arranged to be stacked with a light blocking member interposed between the first displaying unit and the second displaying unit.

According to the present aspect, the first displaying unit and the second displaying unit are arranged to be stacked with the light blocking member interposed between the first displaying unit and the second displaying unit. Accordingly, size reduction of a device is achieved.

(8) In the printer-equipped digital camera of any one of (1) to (6), the first displaying unit and the second displaying unit are arranged with the instant film pack interposed between the first displaying unit and the second displaying unit.

According to the present aspect, the first displaying unit and the second displaying unit are arranged with the instant film pack interposed between the first displaying unit and the second displaying unit. Accordingly, each of the first displaying unit and the second displaying unit may not need a light blocking structure.

(9) The printer-equipped digital camera of any one of (1) to (8) further comprises an image processing unit that processes the image to be displayed on the first displaying unit.

According to the present aspect, image processing is performed on the image to be displayed on the first displaying unit, that is, an image to be printed on the instant film.

(10) In the printer-equipped digital camera of (9), the image processing unit performs inversion processing.

According to the present aspect, the inversion processing is performed as the image processing.

(11) In the printer-equipped digital camera of (9) or (10), the image processing unit performs edge highlighting processing.

According to the present aspect, the edge highlighting processing is performed as the image processing.

(12) In the printer-equipped digital camera of any one of (1) to (11), the light exit direction restriction member is configured with a louver plate that is included on the displaying surface of the first displaying unit.

According to the present aspect, the light exit direction restriction member is configured with the louver plate.

(13) The printer-equipped digital camera of any one of (1) to (12) further comprises a brightness adjustment unit that adjusts brightness of the second displaying unit, in which the second displaying unit displays the image at brightness set by the brightness adjustment unit, and the first displaying unit displays the image at constant brightness.

According to the present aspect, the brightness of the second displaying unit can be adjusted.

(14) The printer-equipped digital camera of any one of (1) to (13) further comprises an imaging control unit that controls ON and OFF of the imaging unit, in which the imaging control unit switches OFF the imaging unit during displaying of the image on the first displaying unit.

According to the present aspect, the imaging unit is switched OFF during exposure. Accordingly, the peak value of power can be more effectively reduced, and the power load can be reduced.

(15) The printer-equipped digital camera of any one of (1) to (14) further comprises a touch operation detection unit that detects a touch operation performed on a displaying surface of the second displaying unit.

According to the present aspect, the touch operation detection unit is comprised on the displaying surface of the second displaying unit.

(16) In the printer-equipped digital camera of (1), each of the first displaying unit and the second displaying unit is configured with an organic EL display, and the displaying control unit controls ON and OFF of displaying of the first displaying unit and the second displaying unit by controlling ON and OFF of the organic EL display constituting the first displaying unit and the second displaying unit.

According to the present aspect, each of the first displaying unit and the second displaying unit is configured with the organic electro-luminescence display (organic EL display; OELD).

(17) A displaying control method of a printer-equipped digital camera is a displaying control method of a printer-equipped digital camera including a first displaying unit that includes, on a displaying surface, a light exit direction restriction member restricting a light exit direction of light from each pixel to a constant range and exposes a surface of an instant film by displaying an image, and a second displaying unit that displays an image to an outside, the displaying control method comprising switching OFF displaying of the second displaying unit while the instant film is exposed by displaying the image on the first displaying unit.

According to the present aspect, in the printer-equipped digital camera exposing the instant film through the light exit direction restriction member, displaying of the second displaying unit for displaying the image to the outside is switched OFF during exposure. Accordingly, the peak value of power can be reduced, and the power load can be reduced.

According to the present invention, a printer-equipped digital camera capable of printing a high quality image and reducing a power load can be provided.

DESCRIPTION OF THE PREFERRED EMBODIMENTS

Hereinafter, a preferred embodiment of the present invention will be described in detail in accordance with the appended drawings.

Exterior Configuration

Figure 1:
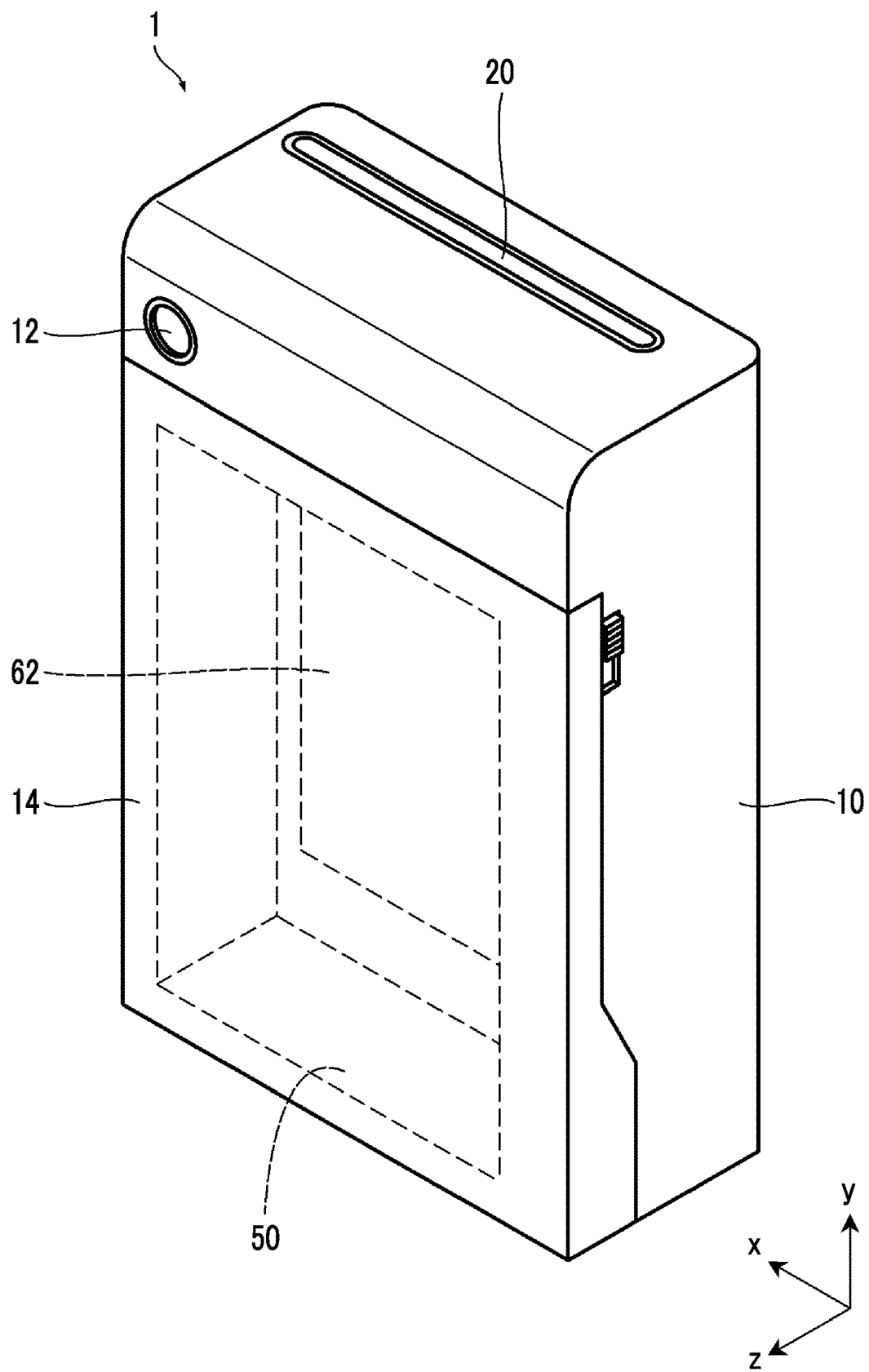
FIG. 1 is a perspective front view illustrating an exterior configuration of one embodiment of a printer-equipped digital camera.
Figure 2:
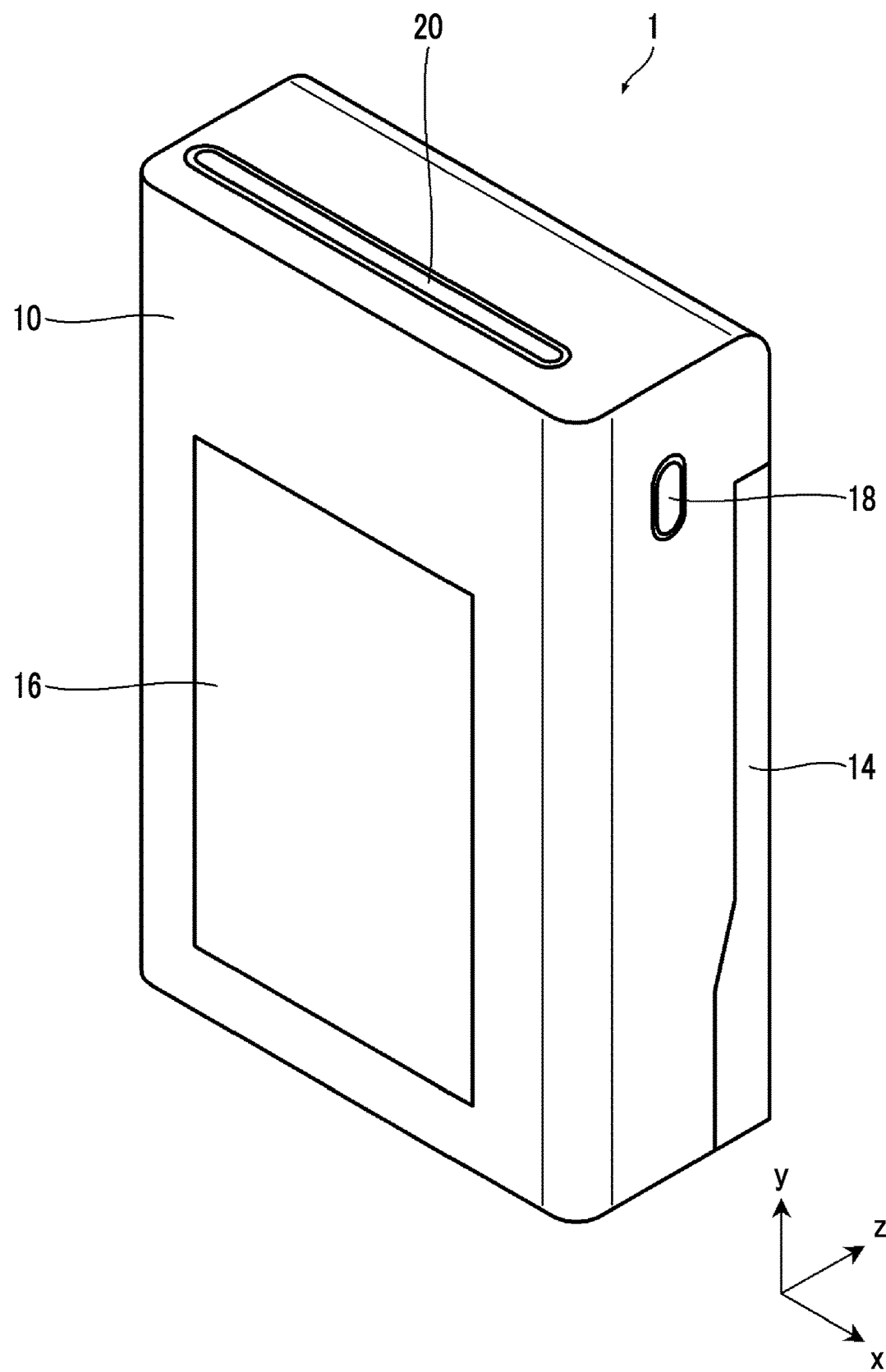
FIG. 2 is a perspective rear view of the printer-equipped digital camera illustrated in FIG. 1.

FIG. 1 is a perspective front view illustrating an exterior configuration of one embodiment of a printer-equipped digital camera. FIG. 2 is a perspective rear view of the printer-equipped digital camera illustrated in FIG. 1. In FIG. 1 and FIG. 2, a direction indicated by arrow x is a left-right direction of a printer-equipped digital camera 1. A direction indicated by arrow y is an up-down direction of the printer-equipped digital camera 1. A direction indicated by arrow z is a forward-rearward direction of the printer-equipped digital camera 1. The left-right direction has the same meaning as a lateral direction or a width direction. The up-down direction has the same meaning as a height direction or a longitudinal direction. The forward-rearward direction has the same meaning as a depth direction.

The printer-equipped digital camera 1 of the present embodiment is a printer-equipped digital camera that prints an image using an instant film. The instant film is loaded in the printer-equipped digital camera 1 in a form of an instant film pack.

As illustrated in FIG. 1 and FIG. 2, the printer-equipped digital camera 1 includes a portable camera body 10. The camera body 10 has a small thickness in the forward-rearward direction and has a longitudinal rectangular parallelepiped shape of which a dimension in the longitudinal direction is longer than a dimension in the lateral direction.

An imaging lens 12, a film lid cover 14, and the like are comprised on a front surface side of the camera body 10. The film lid cover 14 is a cover that opens and closes a film loading chamber. The film lid cover 14 is disposed to be openable and closable through a hinge 14a (refer to FIG. 3) comprised on a bottom surface of the camera body 10.

An image displaying display 16 is comprised on a rear surface side of the camera body 10. The image displaying display 16 is a display that displays the image to an outside, and is one example of a second displaying unit. The image displaying display 16 is used as not only a live view monitor in a case of imaging but also a playback monitor or the like in a case of viewing a captured image. Live view is a function of displaying an image captured by the image sensor in real time. The image displaying display 16 is configured with a touch panel display. Accordingly, the image displaying display 16 also functions as an operation unit.

A power button 18 is comprised on a side surface on a single side of the camera body 10. The printer-equipped digital camera 1 is powered ON and OFF by pushing the power button 18 for a long time.

A film discharge port 20 is comprised on an upper surface of the camera body 10. The film discharge port 20 is configured with a slit through which an instant film 110 can pass. The printed instant film 110 is discharged from the film discharge port 20.

Internal Structure

Figure 3:
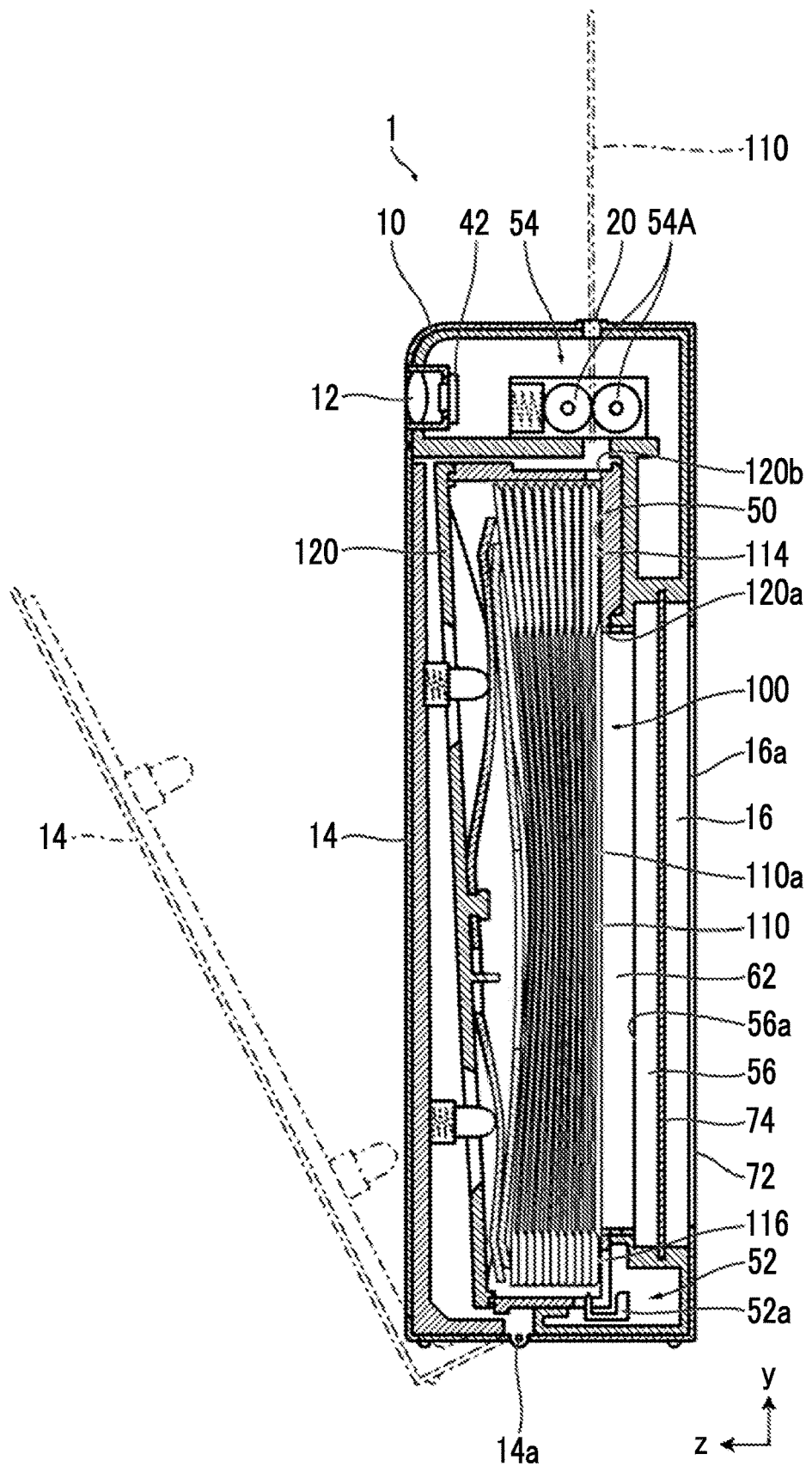
FIG. 3 is a cross-sectional view illustrating a schematic configuration of an inside of the printer-equipped digital camera.

FIG. 3 is a cross-sectional view illustrating a schematic configuration of an inside of the printer-equipped digital camera.

The printer-equipped digital camera 1 comprises the imaging lens 12, the image sensor 42, and the like as a constituent related to a digital camera. The film loading chamber 50, a film forwarding mechanism 52, a film transport mechanism 54, an exposure display 56, and the like are comprised as a constituent related to a printer. The image displaying display 16 is comprised as a constituent common to both.

Imaging Lens

The imaging lens 12 forms an optical image of a subject on a light receiving surface of the image sensor 42. The imaging lens 12 has a focal point adjusting function and is configured to include a stop and a shutter, not illustrated.

Image Sensor

For example, the image sensor 42 is configured with a two-dimensional solid-state imaging element such as a charge coupled device (CCD) image sensor or a complementary metal oxide semiconductor (CMOS) image sensor. The image sensor 42 has an imaging region that has an aspect ratio corresponding to a printable region of the instant film to be used.

In the printer-equipped digital camera 1 of the present embodiment, the imaging lens 12 and the image sensor 42 constitute the imaging unit that electronically captures the subject image.

Film Loading Chamber

The film loading chamber 50 is the loading unit (instant film pack loading unit) for the instant film pack 100. The film loading chamber 50 is configured with a recess portion and is open and closed by the film lid cover 14. The recess portion has a shape in which the instant film pack 100 fits, and is airtightly closed in a darkroom state by closing the film lid cover 14.

Instant Film Pack

The instant film pack 100 has a structure in which a plurality of the instant films 110 are accommodated in a case 120.

Figure 4:
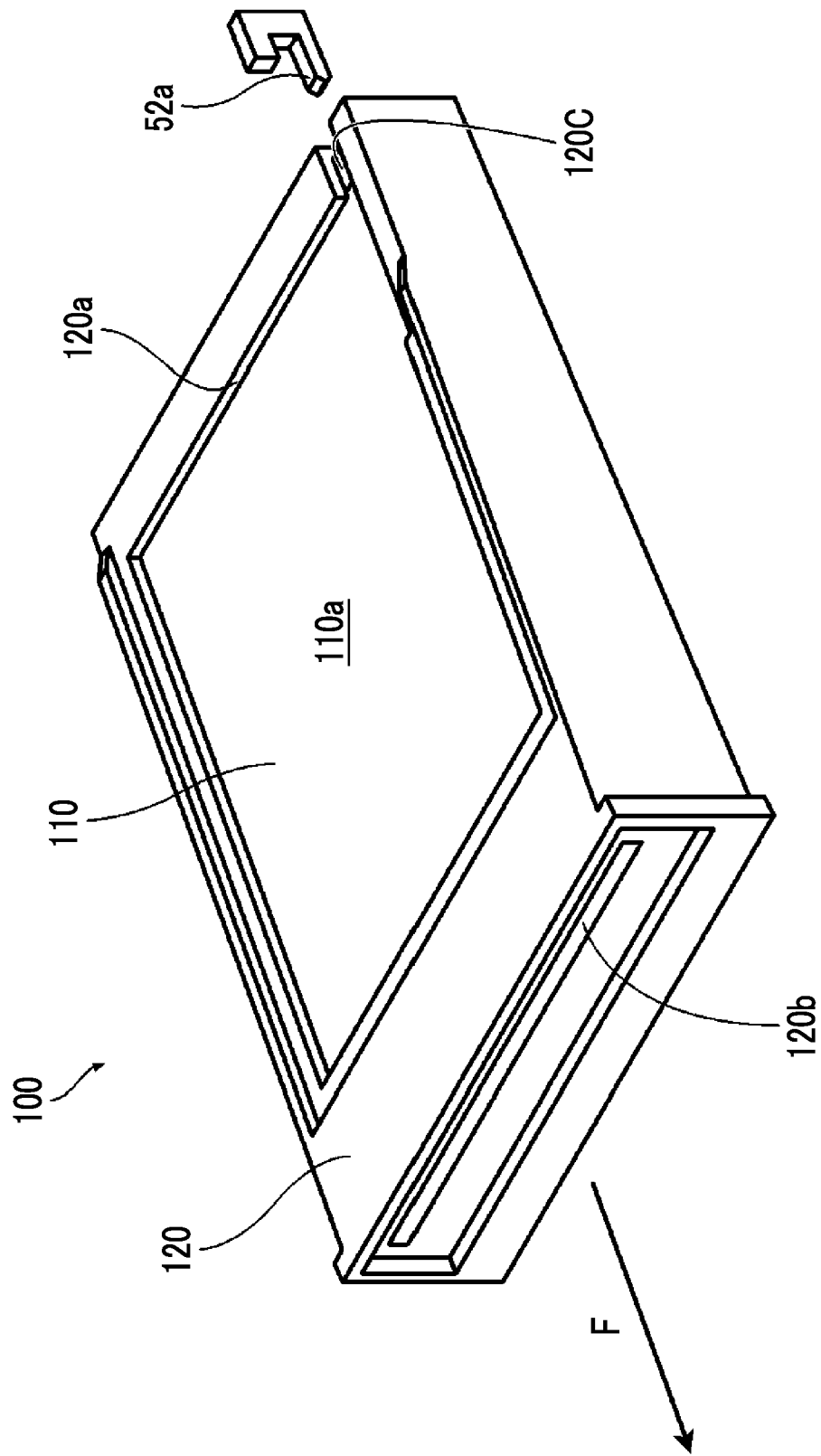
FIG. 4 is a perspective view of an instant film pack.
Figure 5:
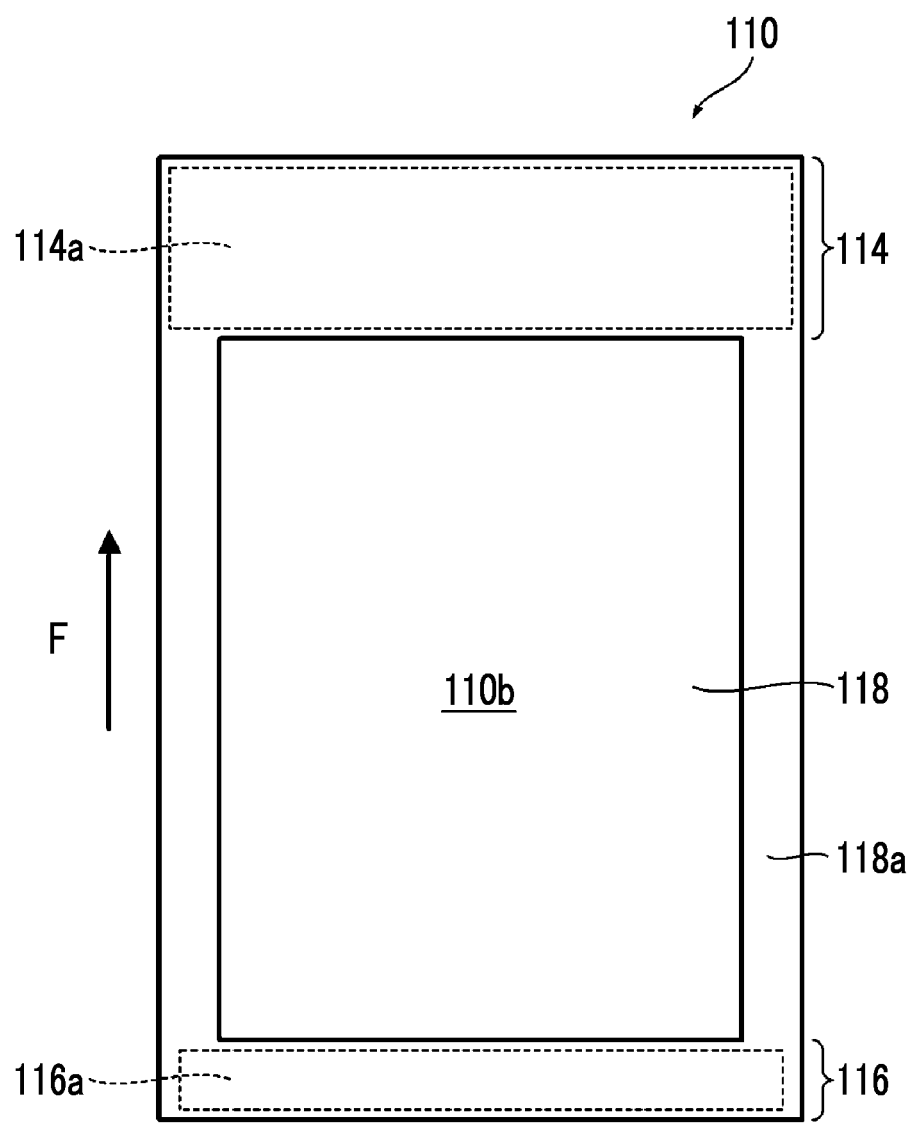
FIG. 5 is a front view of an instant film.
Figure 6:
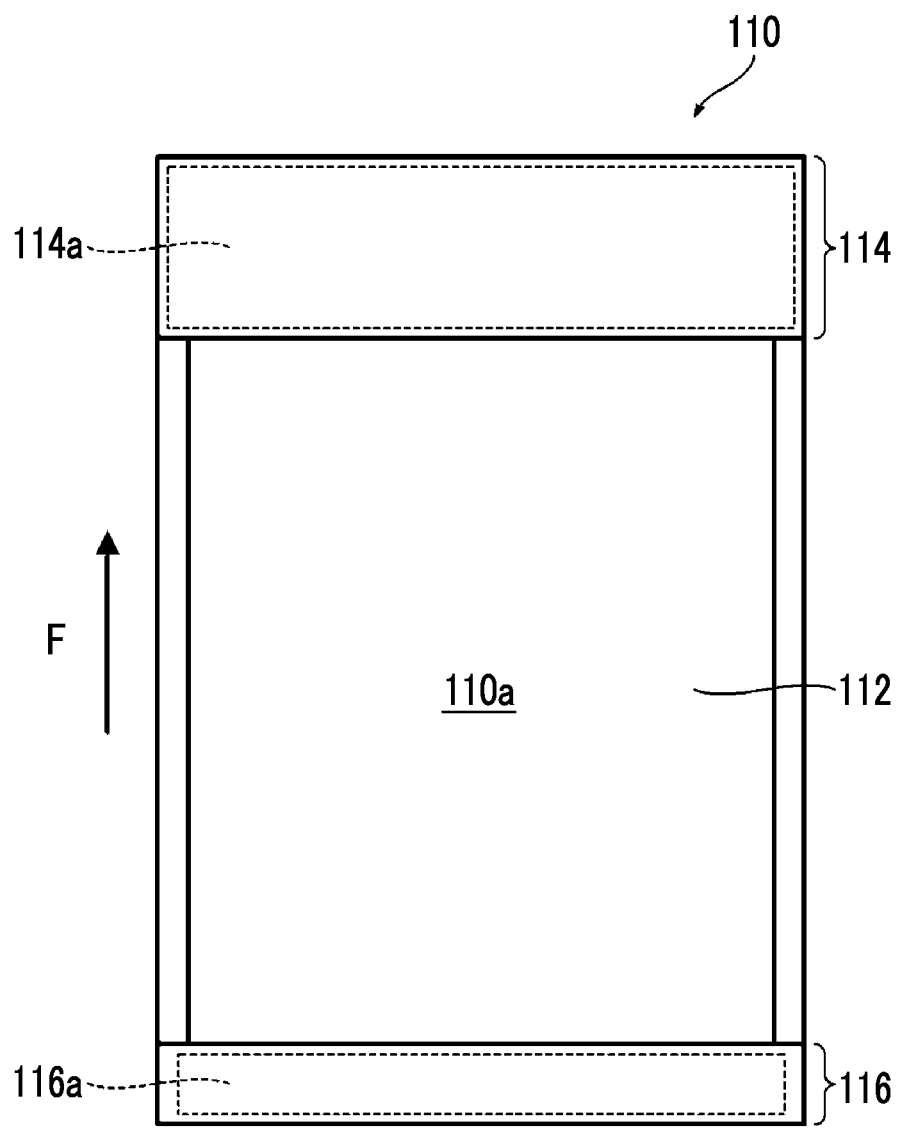
FIG. 6 is a rear view of the instant film.

FIG. 4 is a perspective view of the instant film pack. FIG. 5 is a front view of the instant film. FIG. 6 is a rear view of the instant film. In FIG. 4 to FIG. 6, a direction indicated by arrow F is a forwarding direction of the instant film 110. The instant film 110 is forwarded in the direction indicated by arrow F and is discharged from the case 120.

The instant film 110 is a so-called "mono-sheet type" (referred to as a sheet film type, an integral film, or the like) instant film and is an instant film of a type in which an image appears on a back of the exposure surface. The instant film 110 has a rectangular card shape. A surface of the instant film 110 on one side is configured as an exposure surface 110a, and a surface of the instant film 110 on the other side is configured as an observation surface 110b. The exposure surface 110a is a surface on which an image is recorded by exposure, and the observation surface 110b is a surface on which the recorded image is observed.

As illustrated in FIG. 6, an exposure region 112, a pod portion 114, and a trap portion 116 are comprised on the exposure surface 110a of the instant film 110.

The exposure region 112 is a region in which the image is recorded by exposure. The exposure region 112 is the printable region of the instant film 110. The pod portion 114 and the trap portion 116 are arranged ahead and behind each other in the forwarding direction F with the exposure region 112 interposed therebetween.

The pod portion 114 is arranged ahead of the exposure region 112 in the forwarding direction F. The pod portion 114 incorporates a developing treatment liquid pod 114a that contains developing treatment liquid.

The trap portion 116 is arranged behind the exposure region 112 in the forwarding direction F. The trap portion 116 incorporates an absorbent material 116a.

As illustrated in FIG. 5, an observation region 118 is comprised on the observation surface 110b of the instant film 110. The observation region 118 is a region in which the image is displayed. By performing developing treatment on the exposure region 112, the image is displayed in the observation region 118. The observation region 118 is arranged in correspondence with the exposure region 112. A frame 118a is comprised around the observation region 118. Accordingly, the image is displayed within the frame.

The instant film 110 is viewed in a direction in which the trap portion 116 is up and the pod portion 114 is down. Accordingly, the image is printed in a direction in which trap portion 116 is up and the pod portion 114 is down.

After the exposure, the instant film 110 is subjected to the developing treatment by spreading the developing treatment liquid of the pod portion 114 in the exposure region 112. The developing treatment liquid of the pod portion 114 is squeezed from the pod portion 114 and spread in the exposure region 112 by causing the instant film 110 to pass between a spreading roller pair 54A. The developing treatment liquid that is left at a time of spreading processing is trapped in the trap portion 116.

The case 120 has a rectangular box shape. The case 120 includes a rectangular exposure opening 120a in a front surface part. In addition, the case 120 includes a slit-shaped discharge port 120b in a ceiling surface part. The instant film 110 is stacked and accommodated in the case with the exposure surface 110a facing a front surface side (exposure opening 120a side) of the case 120 and the pod portion 114 facing a ceiling surface side (discharge port 120b side) of the case 120. In addition, the case 120 includes a slit-shaped claw opening portion 120c in a bottom surface part. The instant film 110 accommodated in the case 120 is forwarded one sheet at a time toward the discharge port 120b and discharged from the discharge port 120b by causing a claw 52a to advance from the claw opening portion 120c.

One instant film pack 100 accommodates a plurality (for example, 10) of the instant films 110.

Film Forwarding Mechanism

The film forwarding mechanism 52 forwards the instant film 110 one sheet at a time from the instant film pack 100 loaded in the film loading chamber 50 in order from a top of a stack direction. The film forwarding mechanism 52 comprises the claw 52a that moves forward and rearward in the forwarding direction F of the instant film 110, and forwards the instant film 110 from the instant film pack 100 by scraping the instant film 110 in the case by the claw 52a one sheet at a time from the top of the stack direction.

Film Transport Mechanism

The film transport mechanism 54 transports the instant film 110 that is forwarded from the instant film pack 100 by the film forwarding mechanism 52. The film transport mechanism 54 comprises the spreading roller pair 54A. The spreading roller pair 54A rotates by being driven by a motor, not illustrated, and pinches and transports the instant film 110. The instant film 110 is subjected to the developing treatment while being transported by the spreading roller pair 54A. That is, the developing treatment liquid in the pod portion is subjected to the spreading processing by crushing the pod portion 114 by the spreading roller pair 54A.

Exposure Display

The exposure display 56 is a display for recording the image on the instant film 110. The exposure display 56 records the image on the instant film 110 by exposing the instant film 110 by displaying the image. The exposure display 56 is one example of a first displaying unit. The exposure display 56 is comprised in a bottom surface portion of the film loading chamber 50. In a case where the instant film pack 100 is loaded in the film loading chamber 50, the exposure surface 110a of the instant film 110 accommodated inside the case 120 is arranged to face a displaying surface 56a of the exposure display 56 through the exposure opening 120a. The exposure display 56 has a size in which the instant film 110 can be exposed in one exposure. Accordingly, the displaying surface 56a that has a size greater than at least the observation region 118 of the instant film 110 is included.

The exposure display 56 is configured with a transmissive color liquid crystal display (LCD) comprising a backlight.

Figure 7:
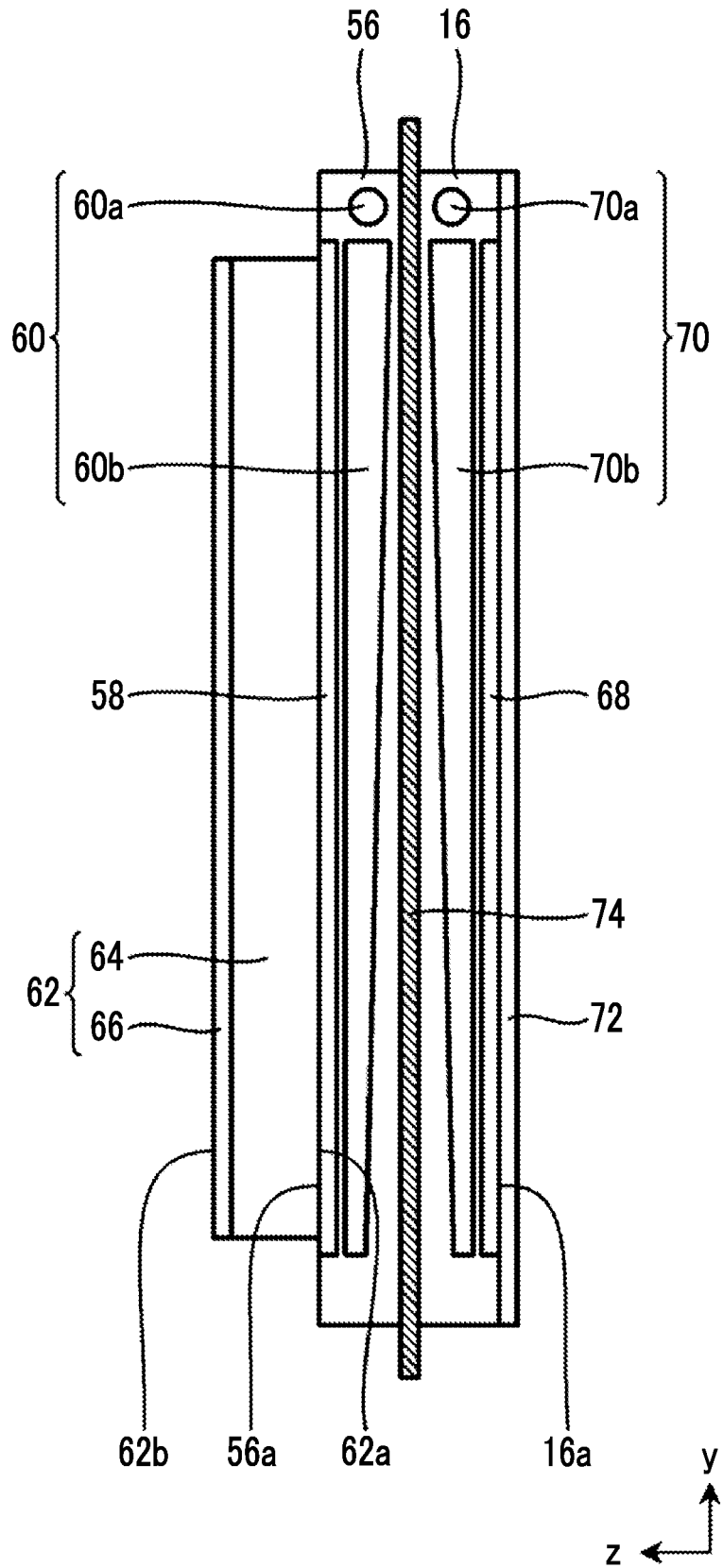
FIG. 7 is a diagram illustrating a schematic configuration of an exposure display and an image displaying display.

FIG. 7 is a diagram illustrating a schematic configuration of the exposure display and the image displaying display.

As illustrated in the drawing, the exposure display 56 comprises an exposure liquid crystal display 58 and an exposure backlight 60. The exposure liquid crystal display 58 is configured with a transmissive color liquid crystal display. The exposure backlight 60 evenly irradiates an entire surface of a display region of the exposure liquid crystal display 58 with light from a rear of the exposure liquid crystal display 58. The exposure backlight 60 comprises a rod-shaped lamp 60a that is a light source, and a light guide plate 60b that evenly guides light exiting from the rod-shaped lamp 60a to the entire surface of the display region of the exposure liquid crystal display 58.

A louver plate 62 is comprised on the displaying surface 56a of the exposure display 56. The louver plate 62 restricts a light exit direction of light from each pixel of the exposure display 56 to a constant range. The louver plate 62 is one example of a light exit direction restriction member. The louver plate 62 has a thin plate shape that is an exterior shape corresponding to the exposure opening 120a of the instant film pack 100. In a case where the instant film pack 100 is loaded in the film loading chamber 50, the louver plate 62 fits in the exposure opening 120a and abuts the exposure surface 110a of the instant film 110 accommodated in the case 120.

Figure 8:
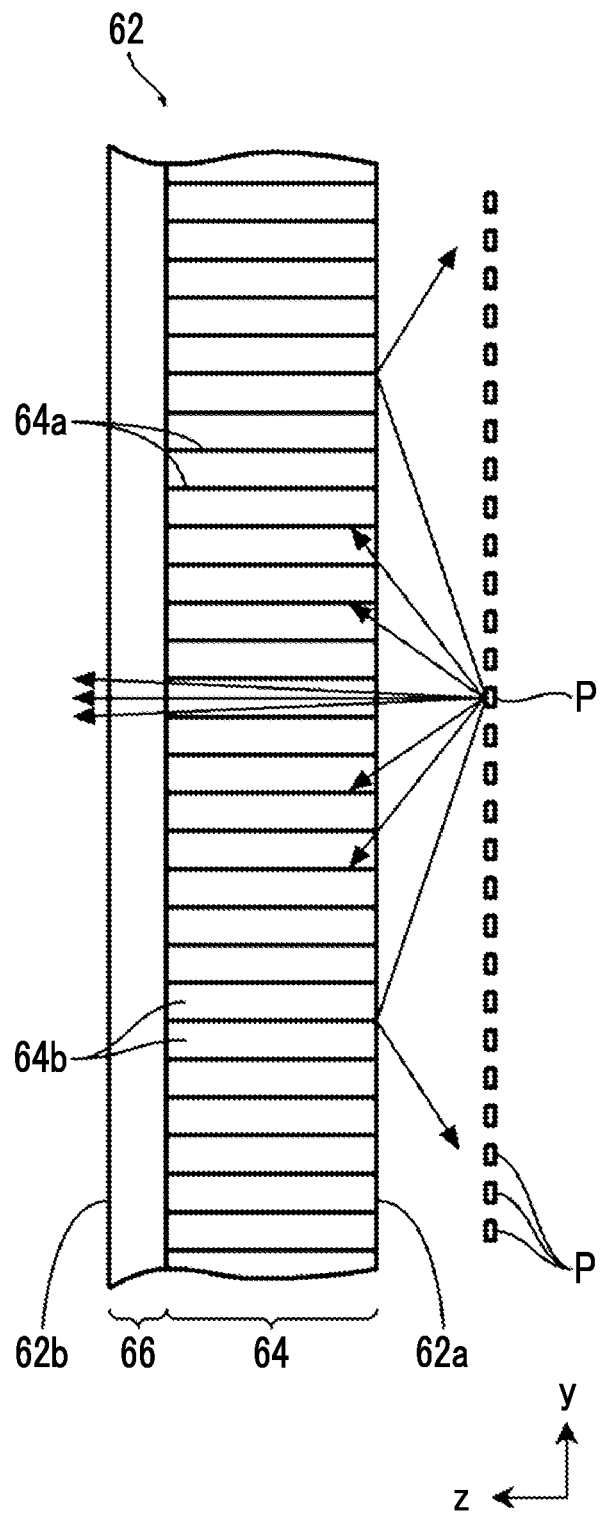
FIG. 8 is an enlarged cross-sectional view of a part of a louver plate.
Figure 9:
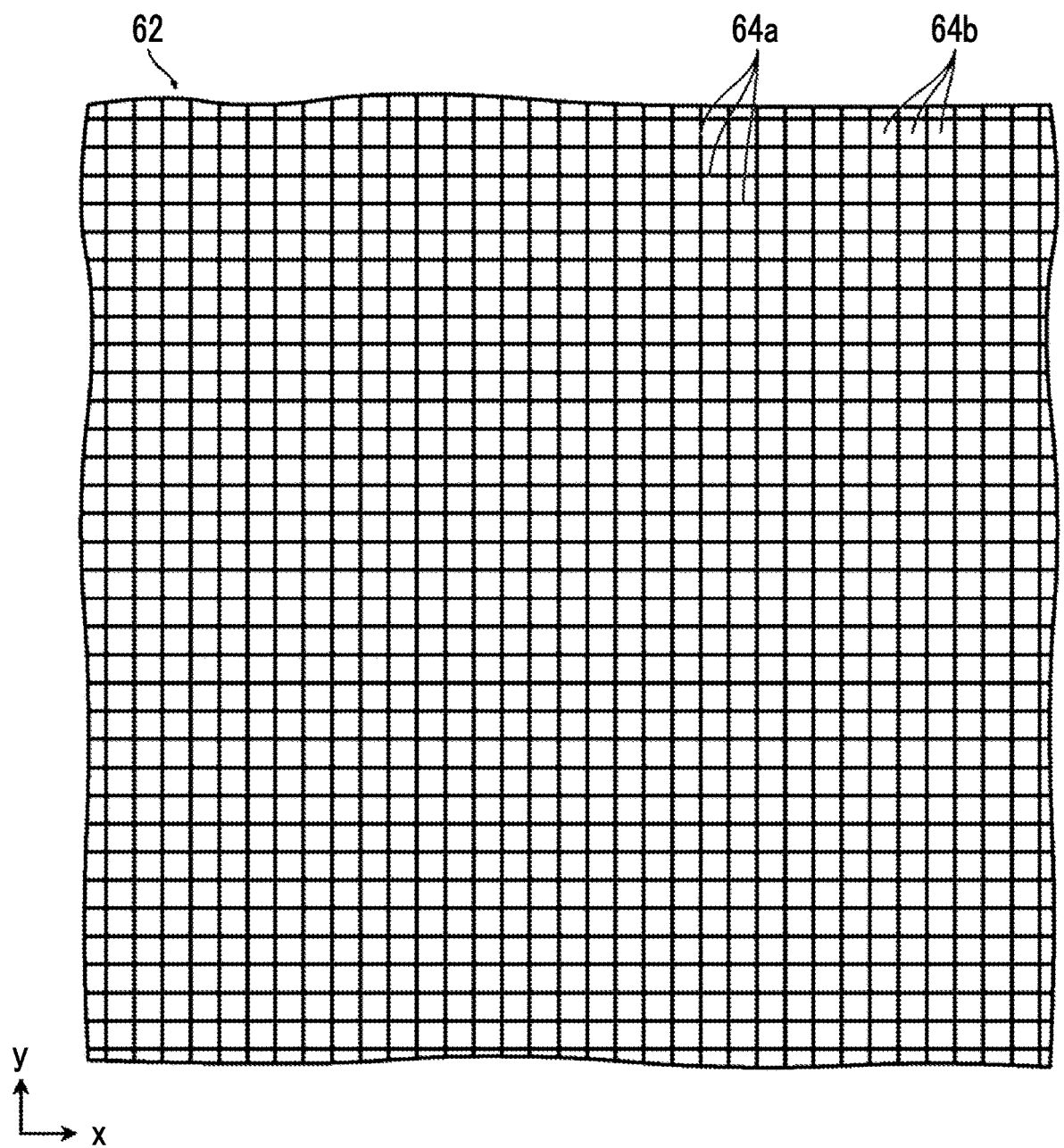
FIG. 9 is an enlarged front view of a part of the louver plate.

FIG. 8 is an enlarged cross-sectional view of a part of the louver plate. FIG. 9 is an enlarged front view of a part of the louver plate.

As illustrated in FIG. 8, the louver plate 62 has a two-layer structure and includes a light exit direction restriction layer 64 on an incidence surface 62a side and a protective layer 66 on an exit surface 62b side. The incidence surface 62a is a surface that is arranged to face the displaying surface 56a of the exposure display 56, and the exit surface 62b is a surface that is arranged to face the exposure surface 110a of the instant film 110.

The light exit direction restriction layer 64 is a layer that restricts a light exit direction of light from each pixel of the exposure display 56 to a constant range. The light exit direction restriction layer 64 is configured with a light blocking portion 64a having a lattice form and a light transmitting portion 64b divided by the light blocking portion 64a. The light blocking portion 64a is configured with a material (for example, a colored resin material (for example, black silicone rubber)) having a light blocking property and includes a wall surface that is perpendicular to the incidence surface 62a and the exit surface 62b. The light transmitting portion 64b is configured with a material (for example, glass or transparent silicone rubber) having a light transmitting property and constitutes an optical path that is perpendicular to the incidence surface 62a and the exit surface 62b of the louver plate 62.

The protective layer 66 is a layer that protects the light exit direction restriction layer 64. The protective layer 66 is configured with a material (for example, acrylic resin, polycarbonate, or vinyl chloride resin) having a light transmitting property.

The louver plate 62 having the above configuration selectively allows transmission of only light that is incident approximately perpendicularly to the incidence surface 62a. In the exposure display 56, since the louver plate 62 is comprised on the displaying surface 56a, a light exit direction of light from each pixel P is restricted to a direction that is approximately perpendicular to the displaying surface 56a. Accordingly, the exposure surface 110a of the instant film 110 can be approximately perpendicularly irradiated with light of each pixel P, and blurriness of the image to be recorded can be prevented.

Image Displaying Display

The image displaying display 16 is configured with a touch panel display. As illustrated in FIG. 7, the image displaying display 16 comprises an image displaying liquid crystal display 68, an image displaying backlight 70, and a touch sensor 72. The image displaying liquid crystal display 68 is configured with a transmissive color liquid crystal display. The image displaying backlight 70 evenly irradiates an entire surface of a display region of the image displaying liquid crystal display 68 with light from a rear of the image displaying liquid crystal display 68. The image displaying backlight 70 comprises a rod-shaped lamp 70a that is a white light source, and a light guide plate 70b that evenly guides light exiting from the rod-shaped lamp 70a to the entire surface of the display region of the image displaying liquid crystal display 68. The touch sensor 72 is comprised on a displaying surface 16a of the image displaying display 16. The touch sensor 72 is one example of a touch operation detection unit. The touch sensor 72 detects a touch operation performed on the displaying surface 16a of the image displaying display 16.

As illustrated in FIG. 3 and FIG. 7, the image displaying display 16 is arranged to be stacked on the exposure display 56. A light blocking wall 74 is comprised between the image displaying display 16 and the exposure display 56. The light blocking wall 74 is one example of a light blocking member and prevents light of the backlight of one from leaking to the display region of the other. Accordingly, exposure of the instant film 110 due to light of the image displaying backlight 70 leaking to an exposure display 56 side can be prevented.

Electric Configuration

Figure 10:
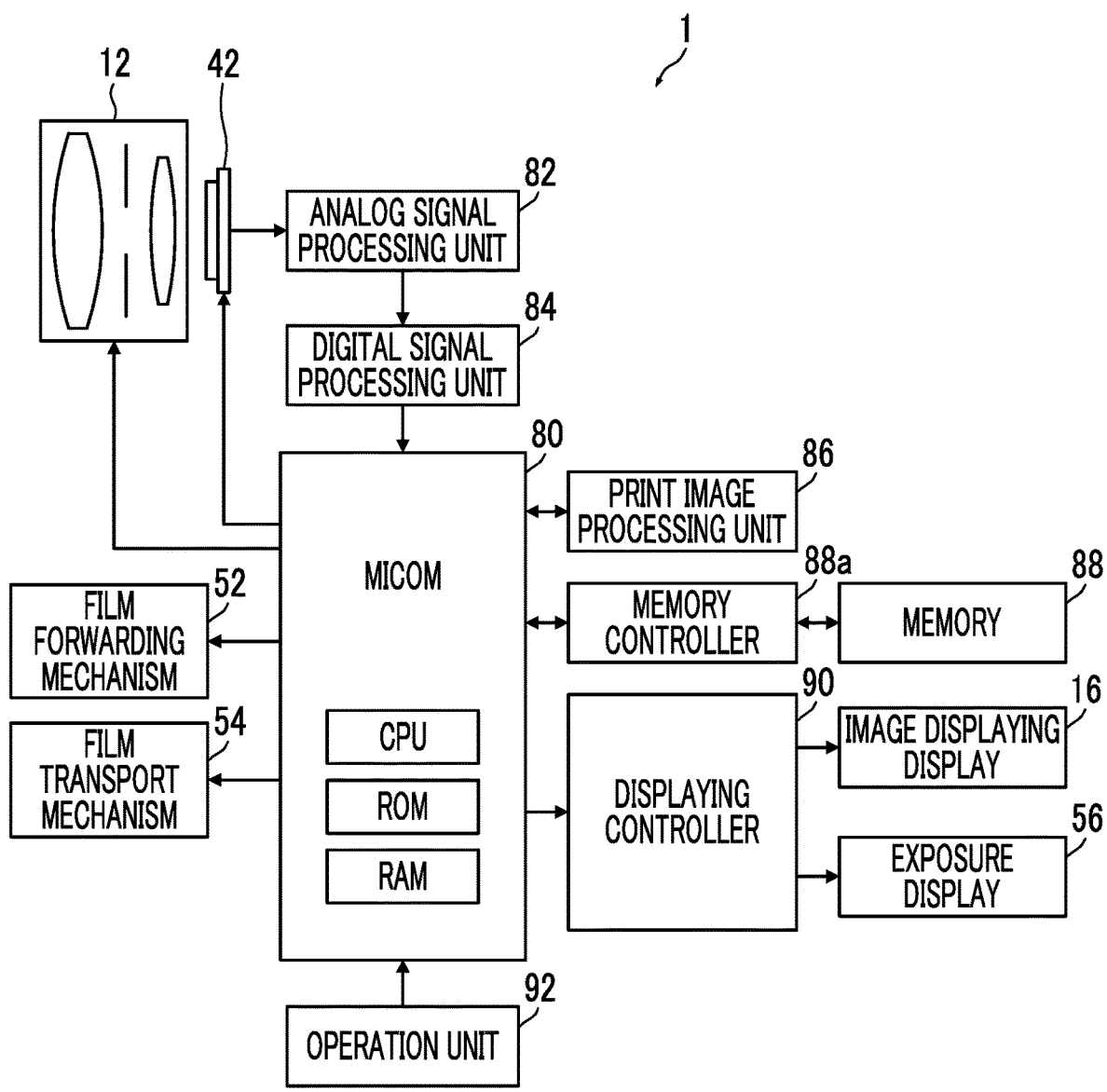
FIG. 10 is a block diagram illustrating an electric configuration of the printer-equipped digital camera.

FIG. 10 is a block diagram illustrating an electric configuration of the printer-equipped digital camera.

As illustrated in the drawing, the printer-equipped digital camera 1 comprises a microcomputer (microcontroller) 80 comprising a central processing unit (CPU), a read only memory (ROM), and a random access memory (RAM). Driving of each unit is controlled by the microcomputer 80. That is, the microcomputer 80 controls driving of the imaging lens 12, the image sensor 42, the film forwarding mechanism 52, the film transport mechanism 54, and the like. The microcomputer 80 controls each unit based on an operation input from an operation unit 92. The operation unit 92 is configured with the power button 18 and the touch sensor 72. The microcomputer 80 implements various control functions by executing a predetermined control program.

The printer-equipped digital camera 1 comprises an analog signal processing unit 82, a digital signal processing unit 84, a print image processing unit 86, a memory 88, a memory controller 88a, and a displaying controller 90.

The analog signal processing unit 82 fetches an analog image signal of each pixel output from the image sensor 42 and performs a predetermined type of signal processing (for example, correlative double sampling processing or amplification processing) on the analog signal. The analog signal processing unit 82 includes an analog to digital converter/AD converter (ADC), and transforms the analog image signal after the predetermined type of signal processing into a digital image signal and outputs the digital image signal.

The digital signal processing unit 84 fetches the digital image signal output from the analog signal processing unit 82 and generates image data by performing a predetermined type of signal processing (for example, gradation transformation processing, white balance correction processing, gamma-correction processing, demosaicing, or YC transformation processing) on the digital image signal. The generated image data is output to the microcomputer 80.

The print image processing unit 86 generates print image data by performing a predetermined type of image processing on the image data to be printed, under control of the microcomputer 80. That is, image data to be displayed on the exposure display 56 is generated. This image data is image data that is optimized for exposure of the instant film 110.

In the printer-equipped digital camera 1 of the present embodiment, since the instant film 110 of the mono-sheet type is used, left-right inversion processing of the image is performed as a part of image processing. In addition, since the instant film 110 is loaded upside down (a top and a bottom are reversed) in the printer-equipped digital camera 1, up-down inversion processing is performed.

Figure 11:
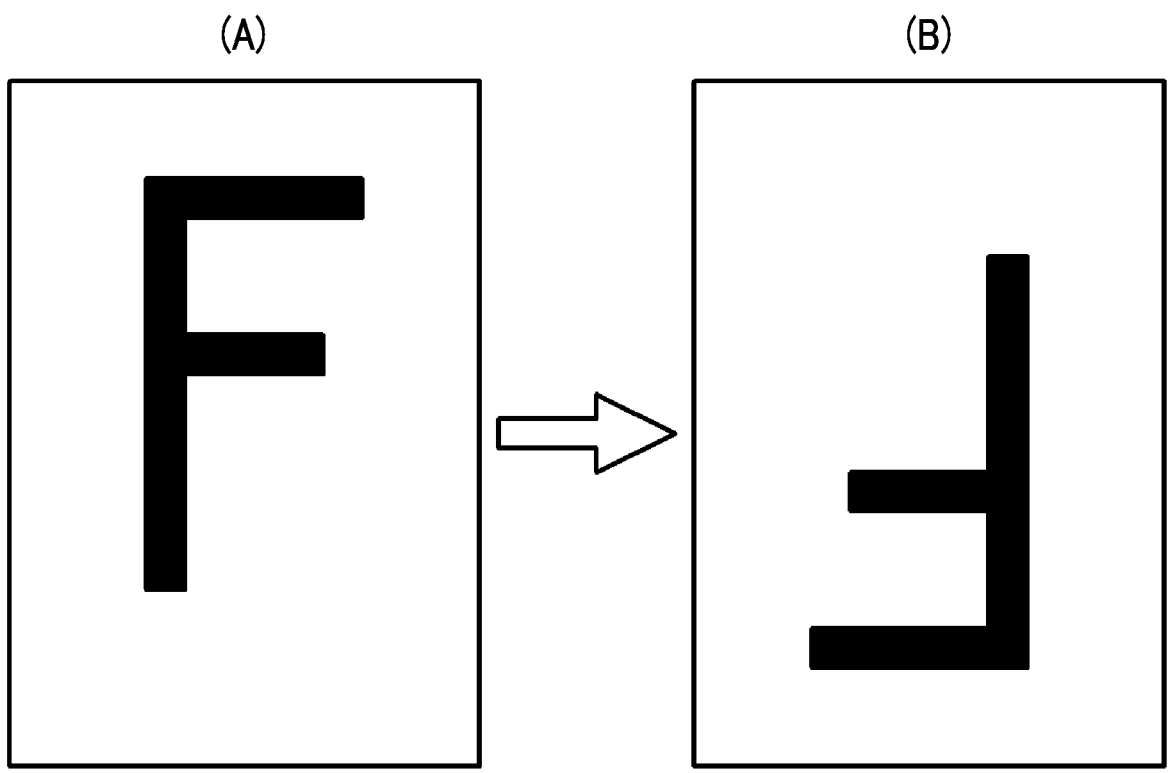
FIG. 11 is a conceptual diagram of generation of a print image.

FIG. 11 is a conceptual diagram of generation of a print image.

In the drawing, (A) is an image represented by image data of a print target, and (B) is an image represented by the print image data. As illustrated in the drawing, the print image is an up-down and left-right inverted image of the original image.

The memory 88 stores various types of data including the image data. The memory 88 is configured with a non-volatile memory such as an electrically erasable programmable read only memory (EEPROM). The memory controller 88a reads and writes data in the memory 88 under control of the microcomputer 80.

The displaying controller 90 displays the images on the image displaying display 16 and the exposure display 56 under control of the microcomputer 80. For example, the displaying controller 90 is configured with large scale integration (LSI).

Figure 12:
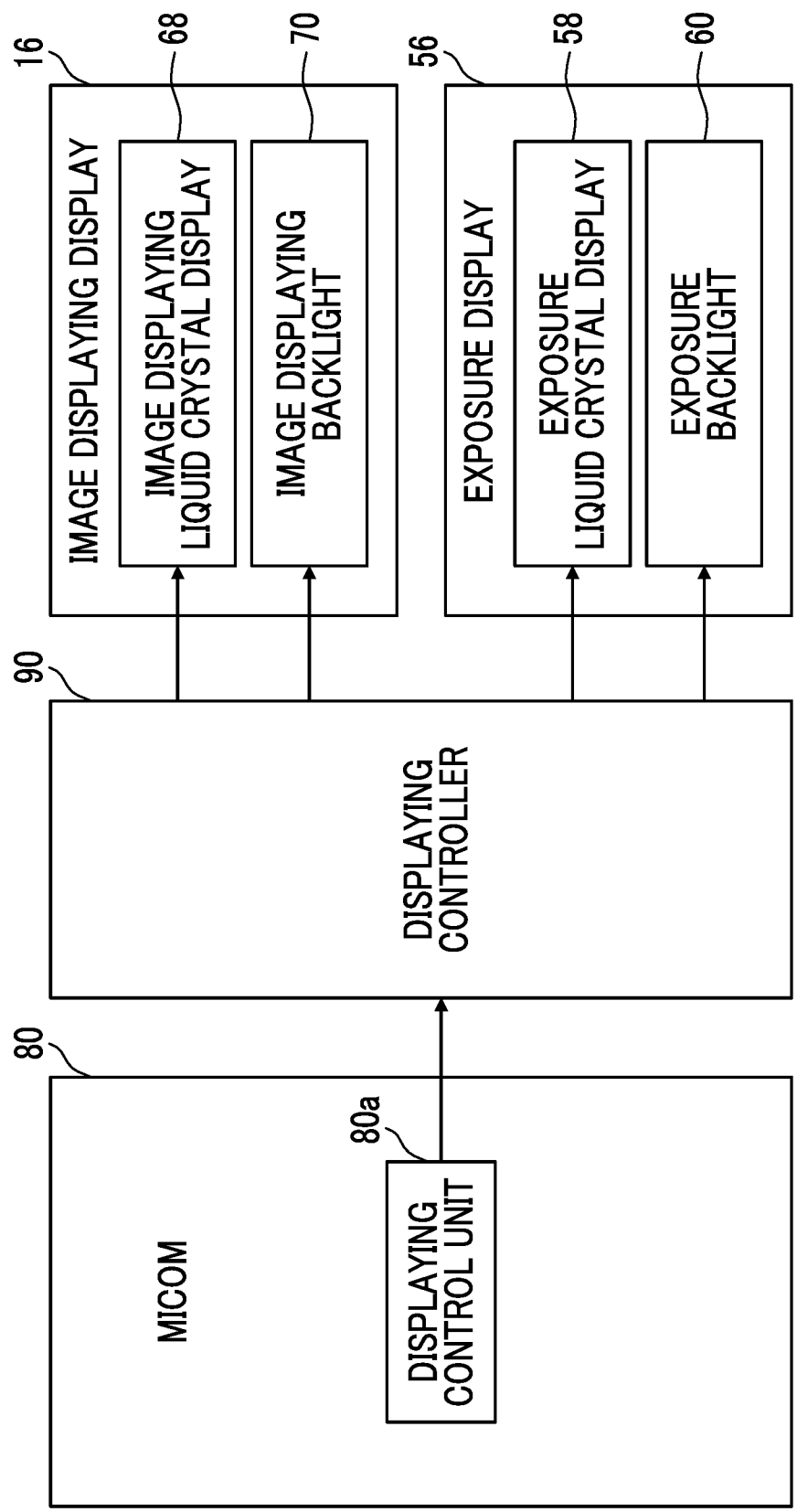
FIG. 12 is a block diagram of functions of a displaying controller.

FIG. 12 is a block diagram of functions of the displaying controller.

In a case of displaying the image on the image displaying display 16, the displaying controller 90 outputs displaying data to the image displaying liquid crystal display 68 and turns ON the image displaying backlight 70. In a case of displaying the image on the exposure display 56, the displaying controller 90 outputs the displaying data to the exposure liquid crystal display 58 and turns ON the exposure backlight 60.

The microcomputer 80 functions as a displaying control unit 80a by executing a predetermined displaying control program and controls displaying of the image displaying display 16 and the exposure display 56 through the displaying controller 90.

In a case where a mode of the printer-equipped digital camera 1 is set to an imaging mode, the displaying control unit 80a displays an image captured by the image sensor 42 on the image displaying display 16 in real time. That is, a live view image is displayed on the image displaying display 16. In addition, an operation button (shutter button or the like) necessary for imaging is displayed on the image displaying display 16. Furthermore, as necessary, information (an F number, a shutter speed, the number of imageable sheets, or the like) necessary for imaging is displayed on the image displaying display 16.

In a case where the mode of the printer-equipped digital camera 1 is set to a playback mode, the displaying control unit 80a displays, on the image displaying display 16, image data that is recorded in the memory 88.

Furthermore, the displaying control unit 80a displays a setting screen for performing various types of setting on the image displaying display 16 in accordance with a call for the setting screen.

In a case of printing the image, the print image is displayed on the exposure display 56. The displaying control unit 80a switches OFF displaying of the image displaying display 16.

Effect of Printer-Equipped Digital Camera

Imaging

In a case where the printer-equipped digital camera 1 is powered ON, the printer-equipped camera 1 is started in the imaging mode. In the imaging mode, the image captured by the image sensor 42 is displayed on the image displaying display 16 in real time. That is, the live view image is displayed on the image displaying display 16. A user checks adjustment of composition, a state of focusing on a main subject, and the like using the image displaying display 16 as a finder.

Figure 13:
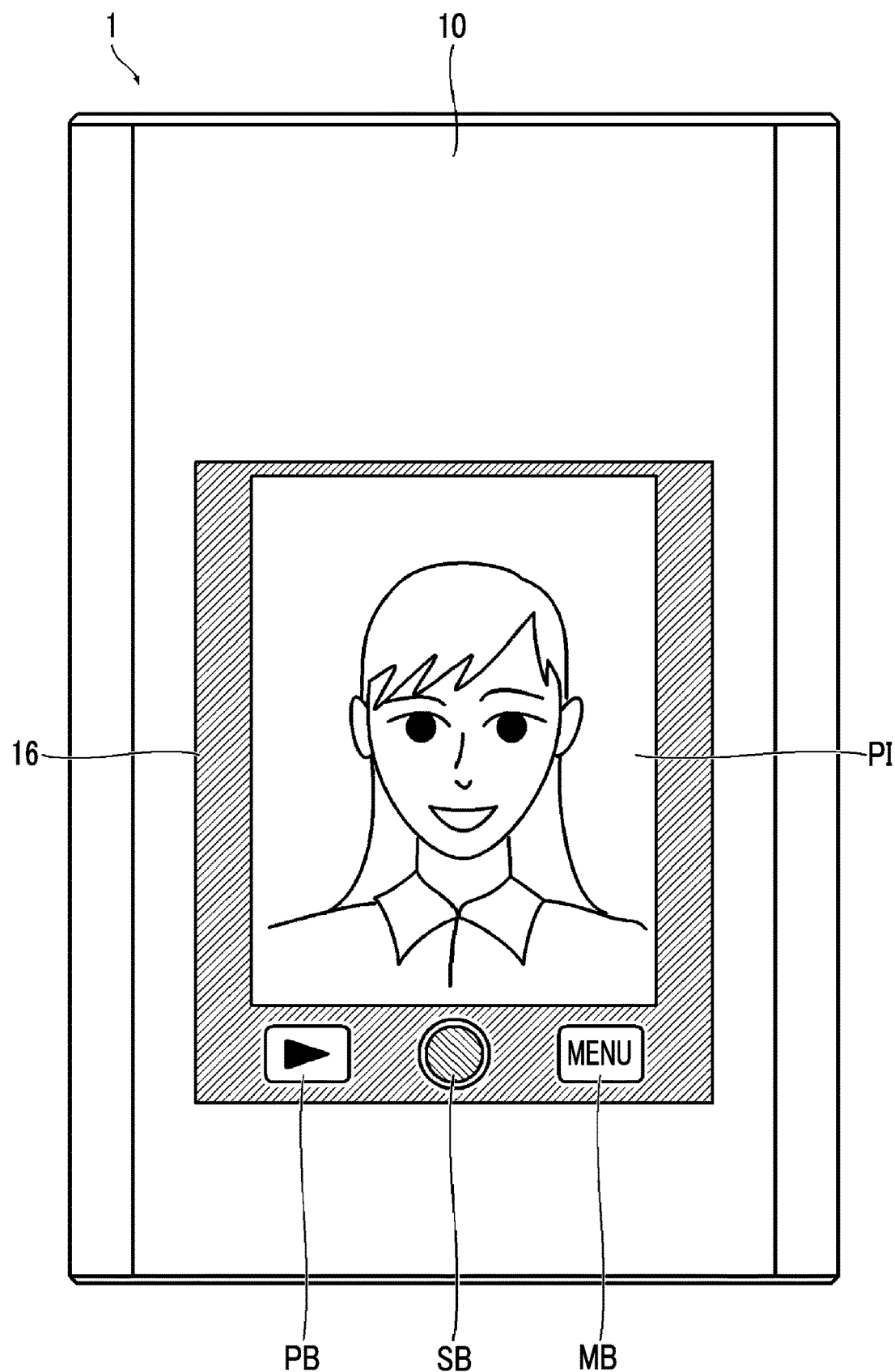
FIG. 13 is a diagram illustrating one example of displaying of an image displaying display in an imaging mode.

FIG. 13 is a diagram illustrating one example of displaying of the image displaying display in the imaging mode.

As illustrated in the drawing, the image displaying display 16 displays a live view image LI and various operation buttons. In the example illustrated in FIG. 13, a case where a shutter button SB, a playback button PB, and a menu button MB are displayed as the operation buttons is illustrated. The shutter button SB is a button for providing an instruction to record (capture) the image. The playback button PB is a button for providing an instruction to switch to the playback mode. The menu button MB is a button for providing an instruction to display a menu screen.

The user provides the instruction to record the image by touching the shutter button SB. In a case where the instruction to record the image is provided, recording image data is fetched from the image sensor 42, subjected to a necessary type of signal processing, and recorded in the memory 88.

Playback

In a case where the playback button PB displayed on the image displaying display 16 is touched in a state of the imaging mode, the mode of the printer-equipped digital camera 1 is switched to the playback mode.

In a case where switching is performed to the playback mode, image data of an image that is captured last (image that is recorded last in the memory 88) is read out from the memory 88 and displayed on the image displaying display 16.

Figure 14:
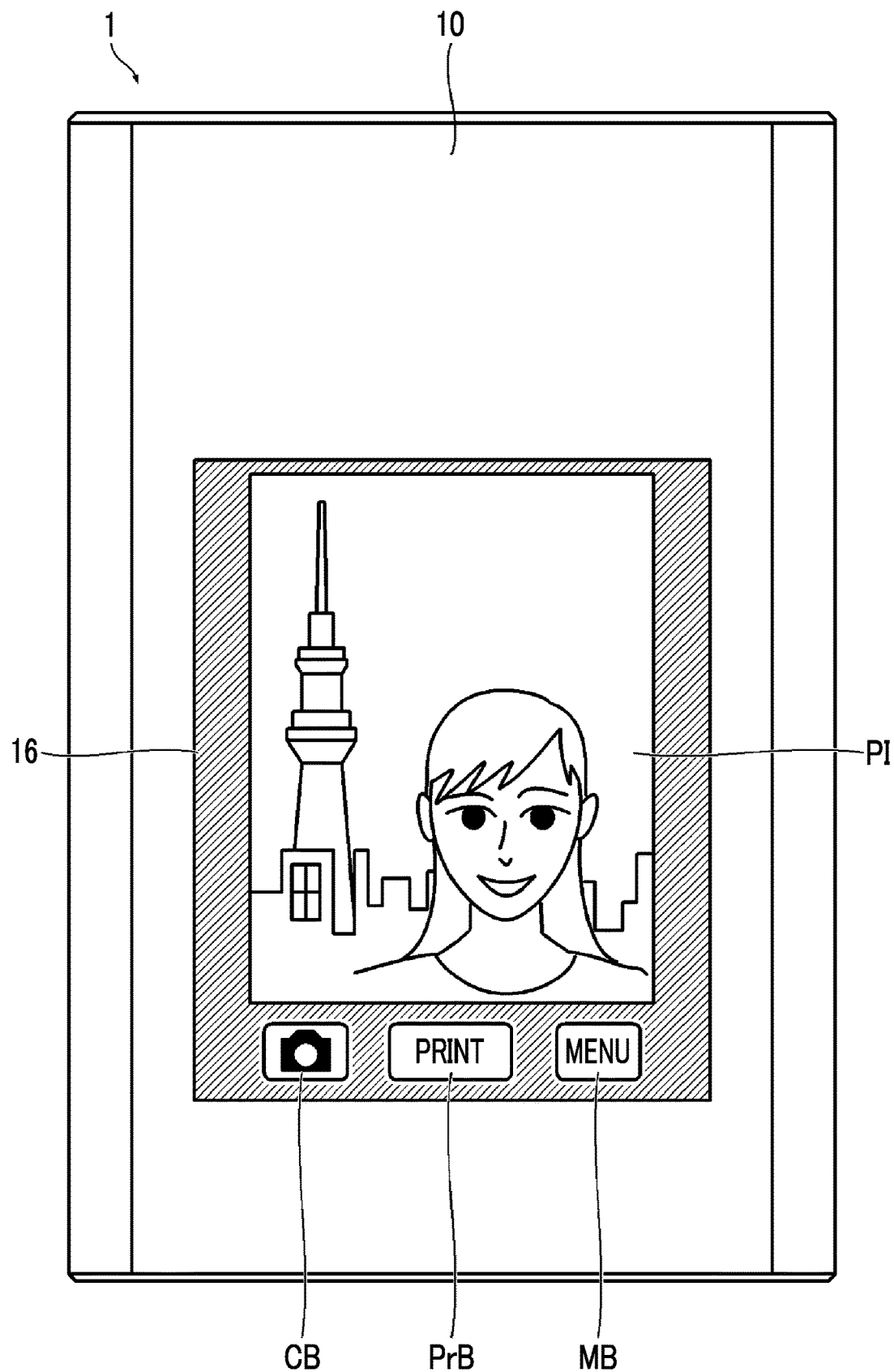
FIG. 14 is a diagram illustrating one example of displaying of the image displaying display in a playback mode.

FIG. 14 is a diagram illustrating one example of displaying of the image displaying display in the playback mode.

As illustrated in the drawing, the image displaying display 16 displays a playback image PI and various operation buttons. In the example illustrated in FIG. 14, a case where a print button PrB, a camera button CB, and the menu button MB are displayed as the operation buttons is illustrated. The print button PrB is a button for providing a print instruction for the displayed image. The camera button CB is a button for providing an instruction to switch to the imaging mode. The menu button MB is a button for providing an instruction to display a menu screen.

In a case of printing the displayed image, the user touches the print button PrB. In a case of forwarding a frame, a flick operation is performed on a screen of the image displaying display 16. The flick operation is an operation of swiping the screen with a fingertip. In a case of enlarging the displayed image, a pinch-out operation is performed on the screen of the image displaying display 16. The pinch-out operation is an operation of increasing an interval between fingers while two fingers are in contact with the screen. In a case of reducing the displayed image, a pinch-in operation is performed on the screen of the image displaying display 16. The pinch-in operation is an operation of decreasing an interval between fingers while two fingers are in contact with the screen.

Print

As described above, in a case where the print button PrB is touched during playback of the image in the playback mode, the displayed image is printed. In addition, in a case where an auto print mode is selected in the imaging mode, the captured image is printed without waiting for a print instruction. For example, setting ON and OFF of the auto print mode is performed by calling a setting screen for the mode from the menu screen.

In a case where the print instruction is provided, the image data of the print target is provided to the print image processing unit 86, and the print image data is generated. The microcomputer 80 displays the generated print image data on the exposure display 56 by providing the print image data to the displaying controller 90. Accordingly, the print image is displayed on the exposure display 56.

The instant film 110 is exposed by displaying the image on the exposure display 56. The instant film 110 is exposed by irradiating the instant film 110 with light from each pixel of the exposure display 56 through the louver plate 62. The louver plate 62 has an effect of allowing transmission of only light that is approximately perpendicular to the exposure surface 110*a*. Accordingly, blurriness of the image can be prevented, and a high quality image can be printed.

The image is displayed at constant brightness for a constant time period. An exposure time period is set based on the brightness of the exposure display 56. That is, the exposure time period is set to a time period in which the instant film 110 can be appropriately exposed.

In a case where a constant time period elapses from a start of displaying, displaying of the exposure display 56 is switched OFF, and the exposure is finished. In a case where the exposure is finished, the film forwarding mechanism 52 and the film transport mechanism 54 are driven. By driving the film forwarding mechanism 52, the exposed instant film 110 is discharged from the case 120 by the claw 52*a*. The instant film 110 discharged from the case 120 is discharged from the film discharge port 20 by the spreading roller pair 54A. In addition, the developing treatment is performed during discharging. That is, the developing treatment liquid in the pod portion is subjected to the spreading processing by crushing the pod portion 114 by the spreading roller pair 54A, and the developing treatment is performed.

Figure 15:
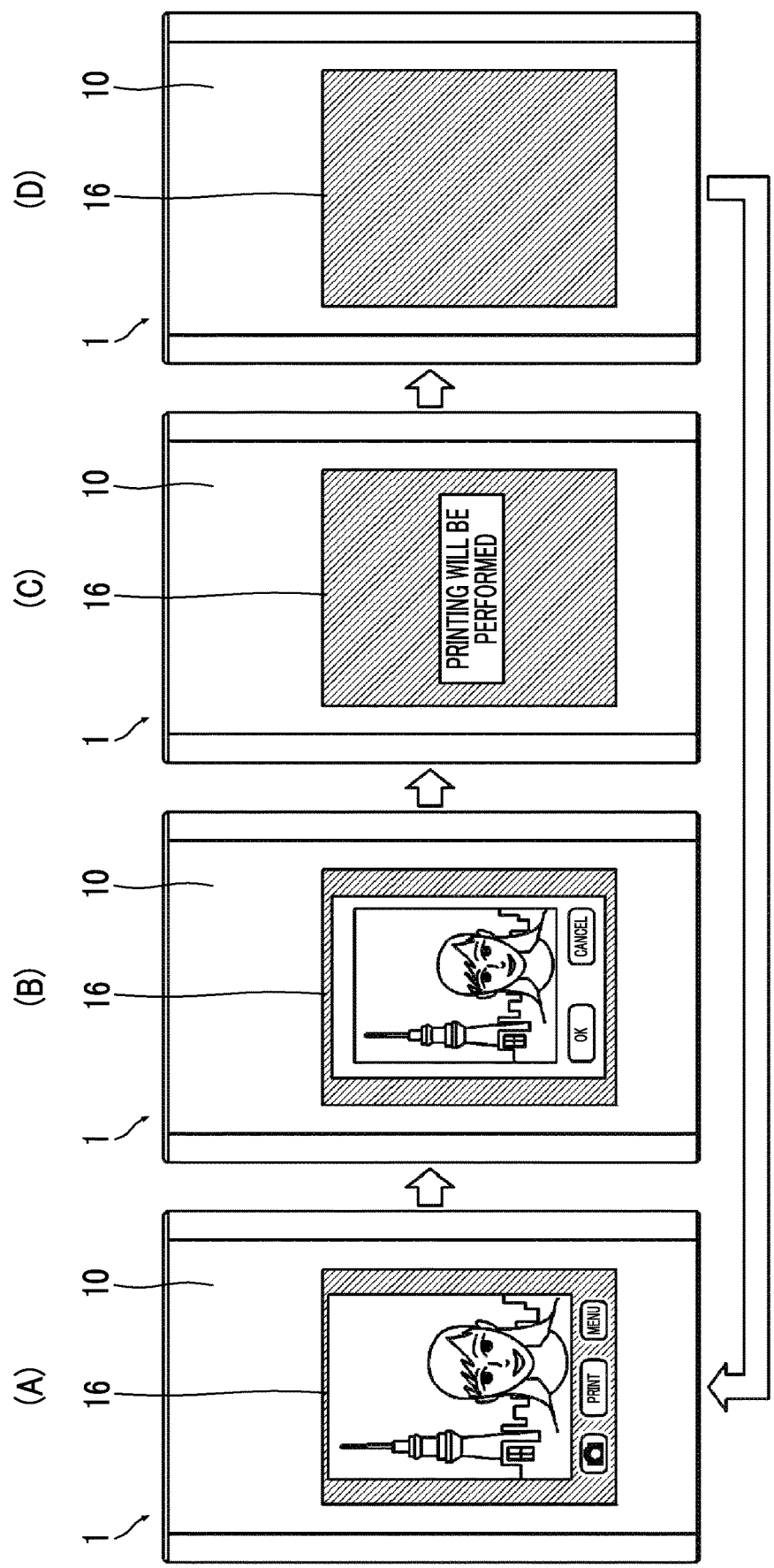
FIG. 15 is a diagram illustrating a transition state of screen displaying of the image displaying display in a case of printing in the playback mode.

FIG. 15 is a diagram illustrating a transition state of screen displaying of the image displaying display in a case of printing in the playback mode.

FIG. 15(A) illustrates a playback state of the image. In this state, in a case where the print instruction for the image in playback is provided by touching the print button, a print checking screen is displayed as illustrated in FIG. 15(B). In the print checking screen, an image of a print is displayed on the image displaying display 16. That is, an image (image in a form of fitting an image of the print target in the observation region 118 of the observation surface 110*b* of the instant film 110) in a case where the image is printed on the instant film 110 is displayed. At the same time, an "OK" button for providing an instruction to execute printing and a "CANCEL" button for providing an instruction to stop printing are displayed. The user touches the "OK" button in a case of executing printing, and touches the "CANCEL" button in a case of stopping printing. In a case where the "CANCEL" button is touched, a return is made to a playback screen illustrated in FIG. 15(A). In a case where the "OK" button is touched, a screen for notifying execution of printing is displayed as illustrated in FIG. 15(C). In this screen, a message "printing will be performed" is displayed. Then, printing is executed. That is, a recording image is displayed on the exposure display 56, and the instant film 110 is exposed. During the exposure, displaying of the image displaying display 16 is switched OFF as illustrated in FIG. 15(D). In a case where the exposure is finished, a return is made to the playback screen of the printed image as illustrated in FIG. 15(A).

Displaying Control of Image Displaying Display and Exposure Display

As described above, in the printer-equipped digital camera 1 of the present embodiment, displaying of the image displaying display 16 is switched OFF during the exposure. Accordingly, a peak value of power can be reduced, and a power load can be reduced. In addition, size reduction of a battery and also size reduction of the entire camera are achieved.

Figure 16:
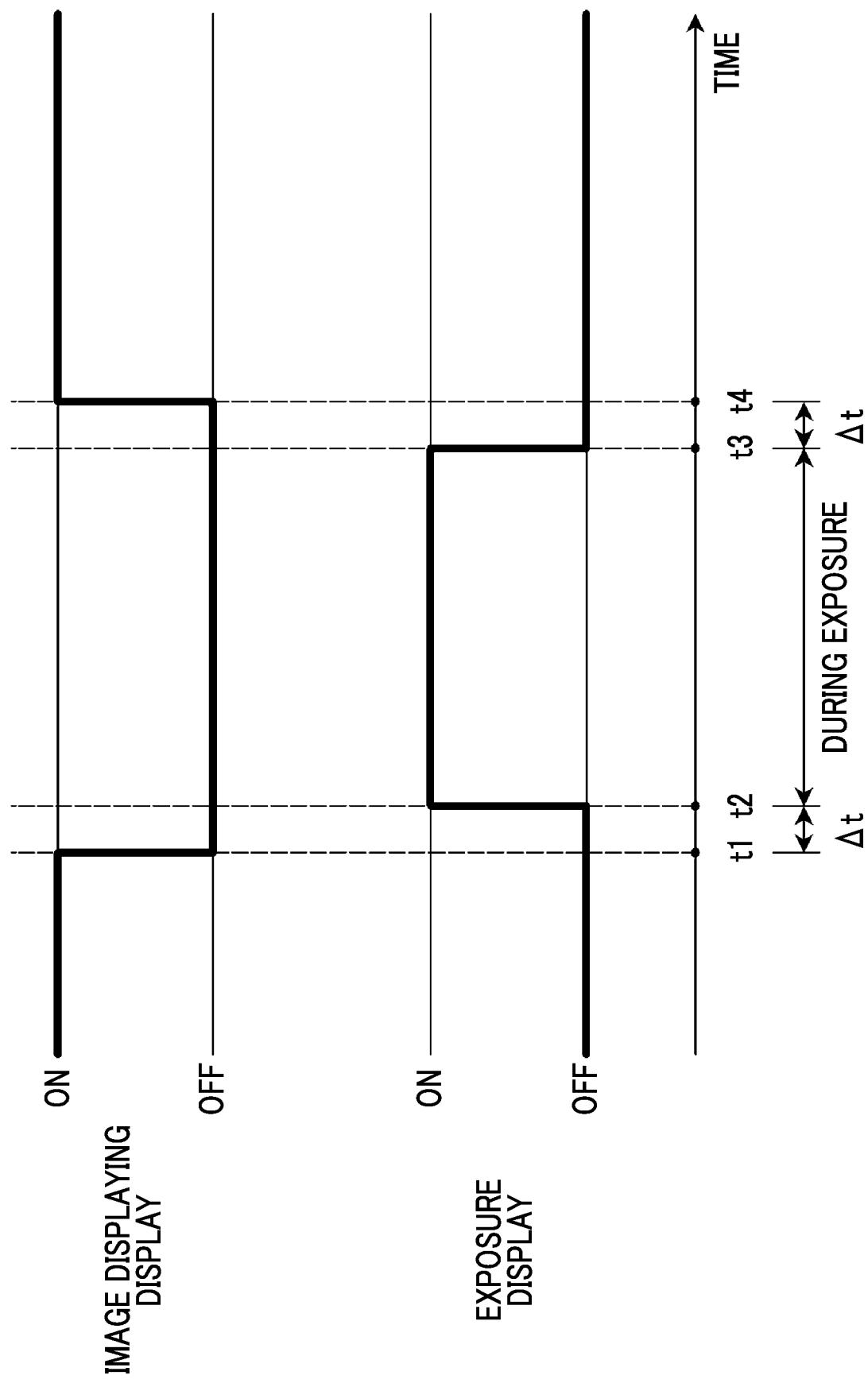
FIG. 16 is a timing chart of a displaying control of the image displaying display and the exposure display.

FIG. 16 is a timing chart of a displaying control of the image displaying display and the exposure display.

The drawing illustrates a form of displaying control in a case where the exposure starts at time t2 and the exposure is finished at time t3. As illustrated in the drawing, while the instant film 110 is exposed by displaying the image on the exposure display 56, displaying of the image displaying display 16 is switched OFF.

Displaying of the image displaying display 16 is switched OFF earlier than the start of the exposure by a constant time period. In other words, in a case of exposing the instant film, the exposure is started after an elapse of a constant time period (after an elapse of Δt) after displaying of the image displaying display 16 is switched OFF.

During the exposure, displaying of the image displaying display 16 is continuously switched OFF. In a case where the exposure is finished, displaying is switched ON after the elapse of the constant time period (after the elapse of Δt). That is, displaying of the exposure display 56 is switched OFF, and displaying is switched ON after the elapse of the constant time period from switching OFF.

During displaying of the exposure display 56, displaying of the image displaying display 16 is always switched OFF. Accordingly, a peak value of power can be reduced, and a power load can be reduced. In a case where the exposure display is performing displaying and displaying of the image displaying display is switched OFF, the user may be notified that the exposure is being performed, by voice or a light source or the like separated from the image displaying display. Accordingly, even in a case where displaying of the image displaying display is switched OFF during the exposure, it can be perceived that the printer-equipped digital camera 1 is not powered OFF, and that the exposure is being performed. Alternatively, a mechanical notification unit of sound, vibration, or the like generated at a time of transporting the film by the film transport mechanism 54 can be used as a notification unit. Using the sound or vibration generated at the time of transporting the film as the notification unit can achieve power saving or reduce the number of components.

MODIFICATION EXAMPLE

Processing in Imaging Mode

In a case of printing in the imaging mode, driving of the imaging unit is preferably switched OFF during the exposure. More specifically, during displaying of the image on the exposure display 56, driving of the imaging lens 12 and the image sensor 42 is switched OFF. Accordingly, the peak value of power can be more effectively reduced. In this case, the microcomputer 80 functions as an imaging control unit and controls driving of the imaging lens 12 and the image sensor 42.

Modification Example 1 of Displaying Control of Image Displaying Display and Exposure Display Controlling ON and OFF of displaying of the image displaying display 16 and the exposure display 56 may be performed by controlling ON and OFF of the backlight.

The backlight consumes more power than driving of the liquid crystal display. Thus, the power load can be sufficiently reduced by controlling ON and OFF of displaying by controlling ON and OFF of the backlight. In addition, the control can be simplified.

Modification Example 2 of Displaying Control of Image Displaying Display and Exposure Display In a case of controlling ON and OFF of displaying of the image displaying display 16 and the exposure display 56 by controlling ON and OFF of the backlight, the same image may be displayed on the image displaying display 16 and the exposure display 56. That is, the same image may be displayed on each liquid crystal display by outputting the same displaying data from the displaying controller 90. Accordingly, the displaying control can be simplified.

In a case of the present example, during the exposure, the image displaying liquid crystal display 68 displays the image during the exposure (image to be recorded on the instant film 110). However, since the image displaying backlight 70 is switched OFF, the image cannot be visually recognized. Similarly, while the live view image is displayed on the exposure liquid crystal display 58 during imaging, the instant film 110 is not exposed since the exposure backlight 60 is switched OFF.

Modification Example 3 of Displaying Control of Image Displaying Display and Exposure Display In a case of displaying the same image on the image displaying display 16 and the exposure display 56, the image displaying display 16 and the exposure display 56 may be configured to be connected to the same image output interface.

Figure 17:
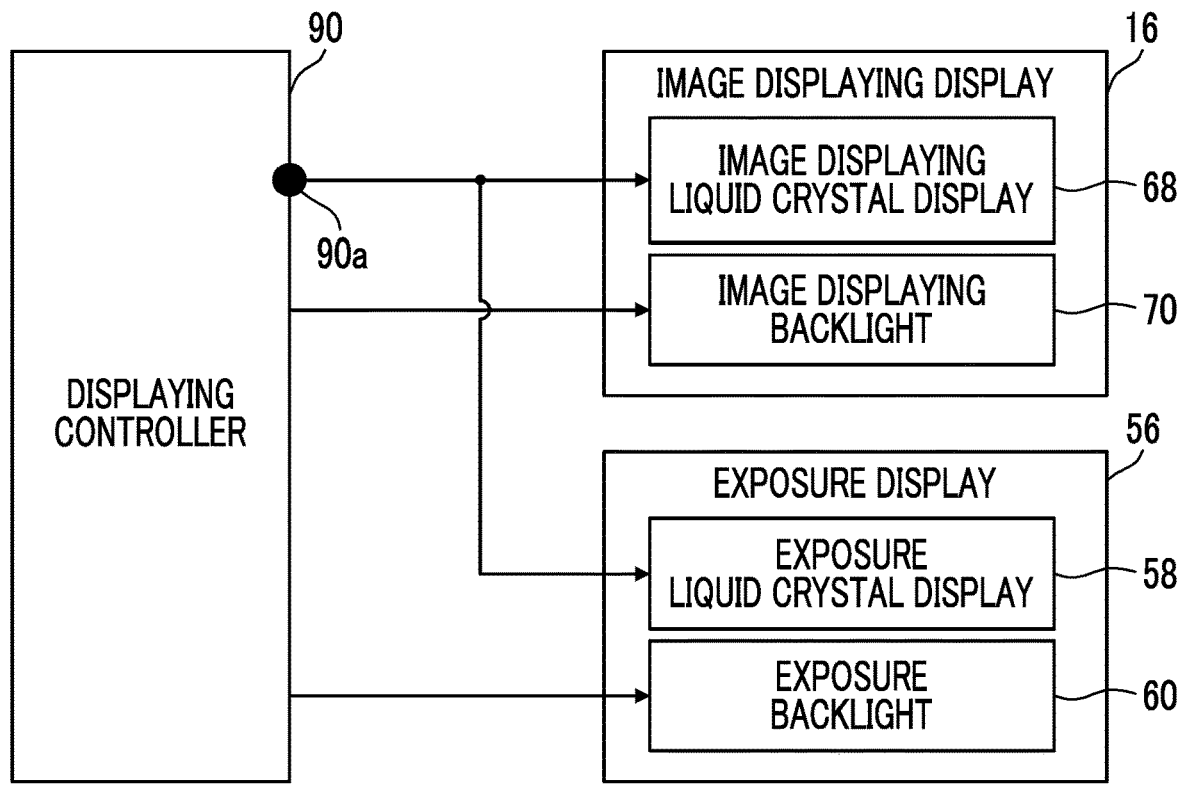
FIG. 17 is a conceptual diagram of a case where the image displaying display and the exposure display are connected to the same image output interface.

FIG. 17 is a conceptual diagram of a case where the image displaying display and the exposure display are connected to the same image output interface.

As illustrated in the drawing, the image displaying display 16 and the exposure display 56 are connected to a same image output interface 90a for the displaying controller 90. More specifically, the image displaying liquid crystal display 68 of the image displaying display 16 and the exposure liquid crystal display 58 of the exposure display 56 are connected to the same image output interface 90a of the displaying controller 90. Accordingly, the same displaying data is provided to the image displaying liquid crystal display 68 and the exposure liquid crystal display 58 from the displaying controller 90, and the same image is displayed.

Sharing an interface for the displaying control between the image displaying display 16 and the exposure display 56 can further simplify a configuration.

Modification Example 4 of Displaying Control of Image Displaying Display and Exposure Display Controlling ON and OFF of displaying of the image displaying display 16 and the exposure display 56 may be performed by switching the backlight to be turned ON using a switch.

Figure 18:
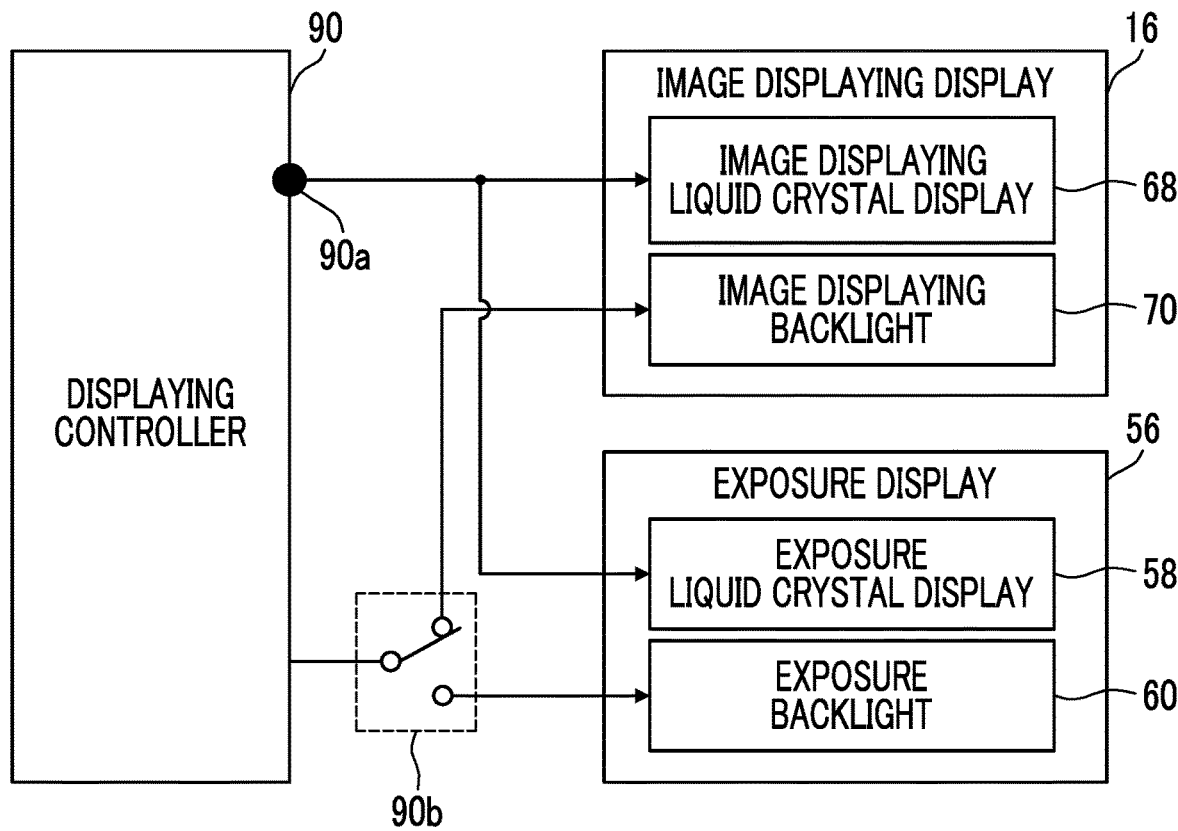
FIG. 18 is a conceptual diagram of a case where controlling ON and OFF of displaying of the image displaying display and the exposure display is performed by switching a backlight to be turned on using a switch.

FIG. 18 is a conceptual diagram of a case where controlling ON and OFF of displaying of the image displaying display and the exposure display is performed by switching the backlight to be turned on using the switch.

As illustrated in the drawing, the image displaying backlight 70 and the exposure backlight 60 are selectively turned on using a switch 90b. Accordingly, any one of the image displaying display 16 and the exposure display 56 can selectively perform displaying.

Modification Example 5 of Displaying Control of Image Displaying Display and Exposure Display As described above, in a case of exposing the instant film 110, the image is displayed on the exposure display 56 at the constant brightness for the constant time period. Accordingly, the brightness of the exposure display 56 is constant.

Meanwhile, it is preferable that the brightness of the image displaying display 16 is freely adjustable by the user. That is, it is preferable to separately dispose a brightness adjustment unit so that the user can adjust the brightness to any brightness. Accordingly, favorable visibility can be secured at all times regardless of a usage environment.

For example, brightness adjustment is performed by preparing a brightness adjustment screen and performing a screen operation. For example, the brightness adjustment screen is configured to be called from the menu screen. Besides, it can be configured that adjustment is performed by disposing a brightness adjustment dial or the like in the camera body 10.

While the constant brightness is set for the exposure display 56, the brightness is set to be higher than the brightness of the image displaying display 16 since the louver plate 62 is comprised in the exposure display 56.

Modification Example of Image Displaying Display and Exposure Display

While both of the image displaying display 16 and the exposure display 56 are configured with a liquid crystal display in the embodiment, a displaying device used as the image displaying display 16 and the exposure display 56 is not limited thereto. Besides, for example, a flat panel display such as an organic electro-luminescence display (OELD), a plasma display, a field emission display (FED), or an electronic paper can be used. The image displaying display 16 and the exposure display 56 do not need to be the same displaying device. For example, one can be configured with a liquid crystal display, and the other can be configured with an organic EL display. The image displaying display 16 and the exposure display 56 having different displaying sizes may be used.

In a case where the image displaying display 16 and the exposure display 56 are configured with a liquid crystal display, a backlight having a surface light emitting configuration may be used.

Considering recording on the instant film, a pixel pitch (distance between adjacent pixels) of the exposure display 56 is preferably less than or equal to 200 μm. In order to obtain a more favorable image, the pixel pitch is preferably less than or equal to 150 μm, more preferably less than or equal to 125 μm, and still more preferably less than or equal to 85 μm.

While glass as a protective layer is generally comprised on a displaying surface of a flat panel display such as a liquid crystal display, a protective layer such as a glass plate having a small thickness is preferably used in a displaying device used in the exposure display 56 in order to decrease a distance from each pixel to the exposure surface of the instant film.

Modification Example of Layout of Image Displaying Display and Exposure Display While it is configured that the image displaying display 16 and the exposure display 56 are arranged to be stacked back to back in the embodiment, a layout of the image displaying display 16 and the exposure display 56 is not limited thereto. For example, the image displaying display 16 and the exposure display 56 can be configured to be arranged with the film loading chamber 50 interposed therebetween. In this case, in a case where the instant film pack 100 is loaded in the film loading chamber 50, the image displaying display 16 and the exposure display 56 are arranged with the instant film 110 interposed therebetween.

Figure 19:
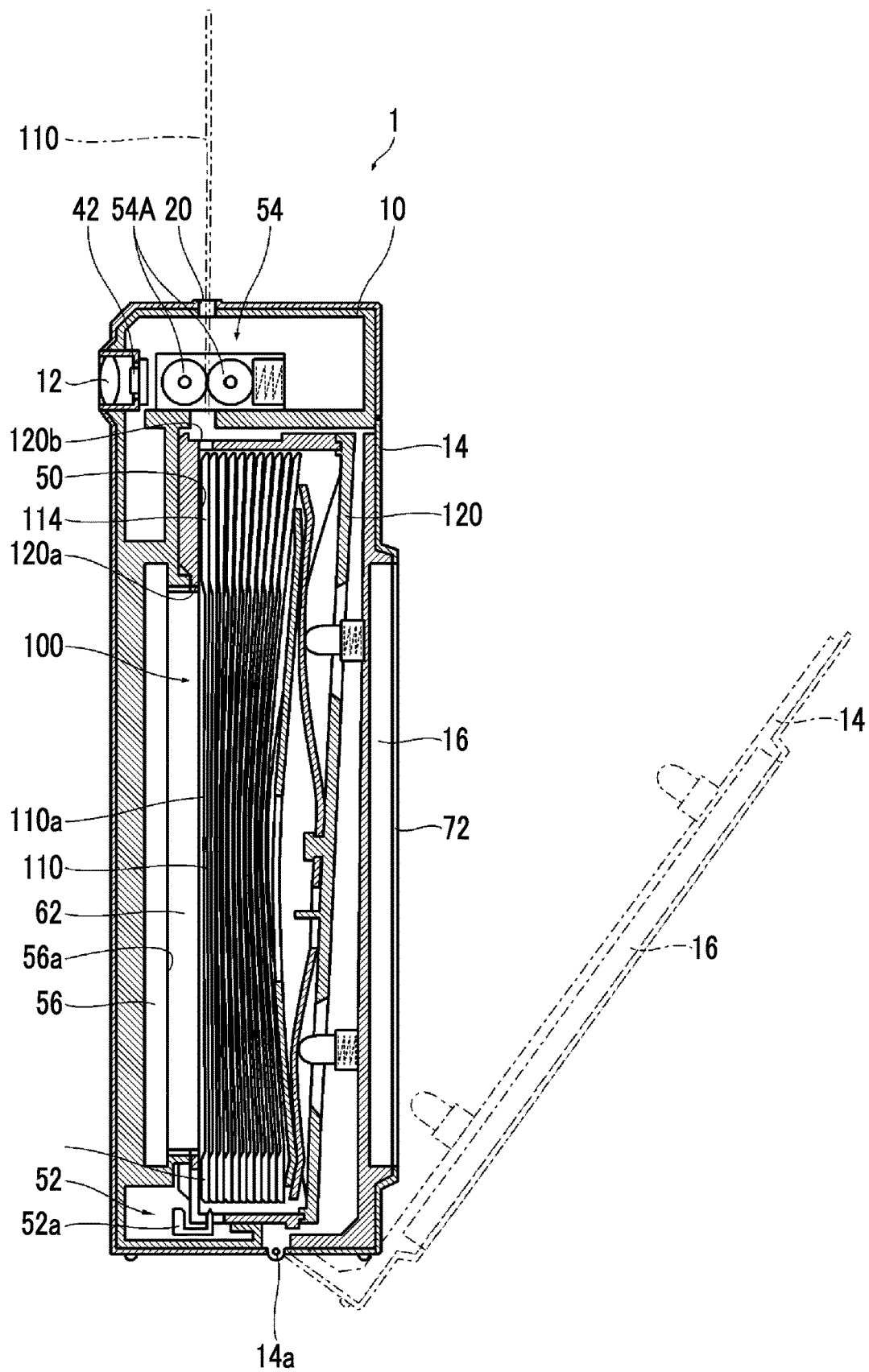
FIG. 19 is a diagram illustrating a schematic configuration of the printer-equipped digital camera in a case where the image displaying display and the exposure display are arranged with the instant film pack interposed therebetween.

FIG. 19 is a diagram illustrating a schematic configuration of the printer-equipped digital camera in a case where the image displaying display and the exposure display are arranged with the instant film pack interposed therebetween.

The drawing illustrates an example of a case where the image displaying display 16 is arranged in the film lid cover 14. By arranging the image displaying display 16 in the film lid cover 14, the image displaying display 16 and the exposure display 56 are arranged with the instant film pack 100 interposed therebetween.

The light blocking wall can be omitted by arranging the image displaying display 16 and the exposure display 56 with the instant film pack 100 interposed therebetween.

Modification Example of Imaging Unit

A plurality of the imaging units may be comprised. For example, the imaging unit may be comprised on each of a front surface and a rear surface of the camera body 10. Alternatively, the imaging unit may be rotatably held in the camera body so that an imaging direction can be adjusted to any direction.

Modification Example of Instant Film

The instant film to be used is not limited to the mono-sheet type, and an instant film of a peel-apart type or the like may be used.

Modification Example of Louver Plate

While the louver plate as the light exit direction restriction member is configured to have a two-layer structure in the embodiment, the louver plate as the light exit direction restriction member may comprise at least the light exit direction restriction layer.

In the light exit direction restriction layer, the light transmitting portion may at least allow passage of light. Accordingly, the light transmitting portion can be configured with a cavity, and the light exit direction restriction member can be configured with only the light blocking portion.

In the light exit direction restriction layer, the light blocking portion may be configured with a material absorbing light or may be configured with a material reflecting light. A colored resin material can be used as the light blocking portion. For example, black silicone rubber can be used. A neutral density filter (ND filter) can be used as the material absorbing light. The ND filter means a filter having a neutral optical density and is a filter that can evenly absorb (absorbance is greater than or equal to 50% and less than or equal to 99.999%; transmittance is greater than or equal to 0.001% and less than or equal to 50%) light without affecting a wavelength in a wavelength range used for exposure.

While the light exit direction restriction layer of the louver plate is configured with a single layer in the embodiment, the light exit direction restriction layer can be configured with a plurality of layers.

Figure 20:
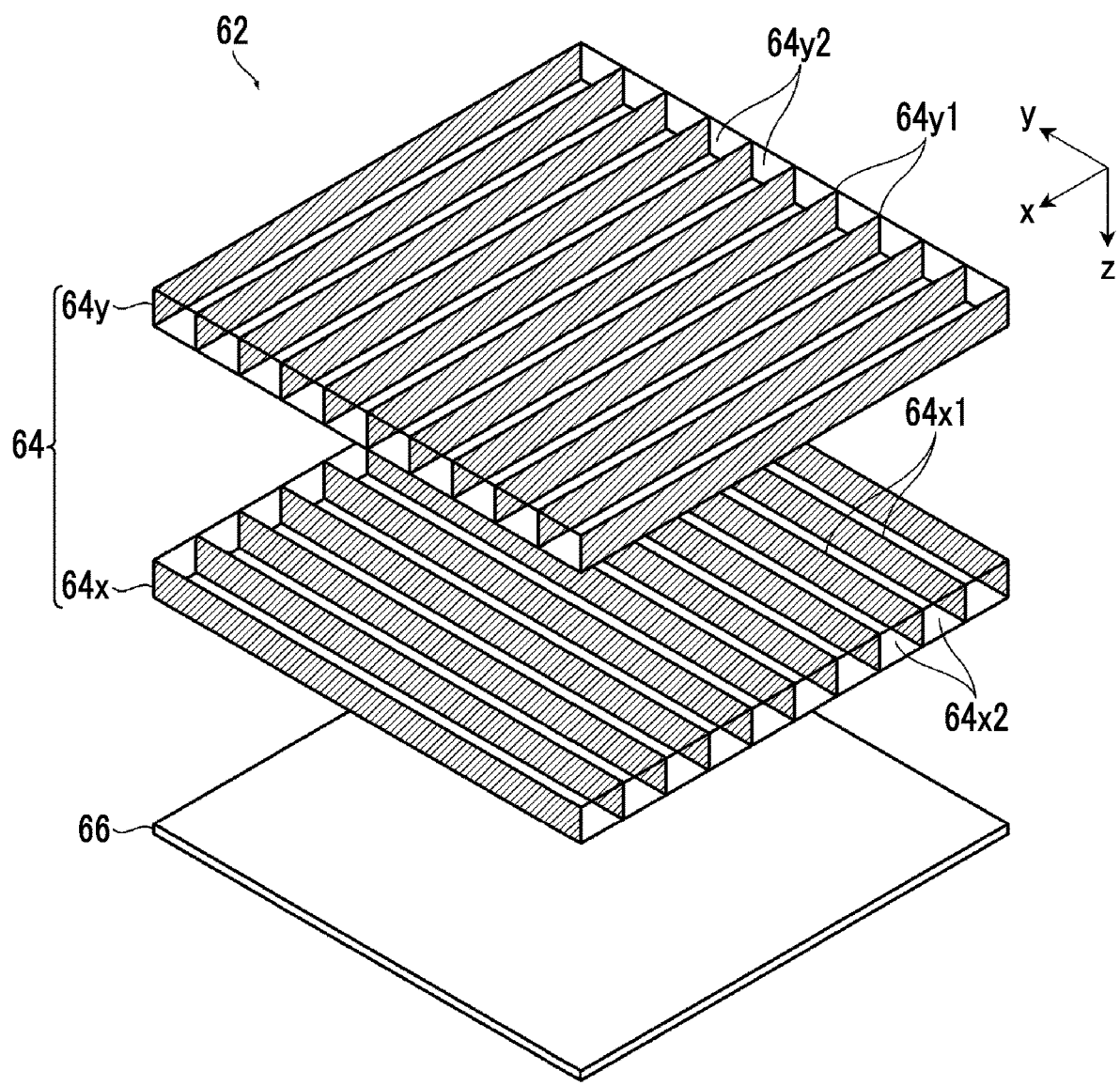
FIG. 20 is a diagram illustrating one example of the louver plate configured with two layers of light exit direction restriction layers.

FIG. 20 is a diagram illustrating one example of the louver plate configured with two layers of light exit direction restriction layers.

As illustrated in the drawing, in the louver plate 62 of the present example, the light exit direction restriction layer 64 has a two-layer structure. More specifically, a first light exit direction restriction layer 64$y$ and a second light exit direction restriction layer 64$x$ are included.

The first light exit direction restriction layer 64$y$ has a structure in which a light blocking portion 64$y$1 extending in the x direction is arranged at a constant pitch in the y direction. A light transmitting portion 64$y$2 is configured between adjacent light blocking portions 64$y$1.

The second light exit direction restriction layer 64$x$ has a structure in which a light blocking portion 64$x$1 extending in the y direction is arranged at a constant pitch in the x direction. A light transmitting portion 64$x$2 is configured between adjacent light blocking portions 64$x$1.

By arranging the first light exit direction restriction layer 64$y$ and the second light exit direction restriction layer 64$x$ to be stacked, a light blocking portion having a lattice form is configured as a whole. Such a louver plate can be configured by stacking a louver plate (louver film) constituting the first light exit direction restriction layer 64$y$ and a louver plate (louver film) constituting the second light exit direction restriction layer 64$x$.

A pitch (distance between adjacent light blocking portions) of the light blocking portion in the light exit direction restriction layer is preferably less than or equal to 80 μm and more preferably less than or equal to 65 μm. By setting the pitch within this range, light from each pixel of the exposure display in an inclined direction can be appropriately blocked, and a high quality image can be recorded on the instant film.

An arrangement direction of the light blocking portion in the light exit direction restriction layer does not necessarily match an arrangement direction of each pixel of the exposure display. A difference in angle can be provided between the arrangement direction of the light blocking portion in the light exit direction restriction layer and the arrangement direction of each pixel of the exposure display. Providing the difference in angle can suppress occurrence of moire. This difference in angle is preferably 1 degrees to 45 degrees, more preferably 5 degrees to 40 degrees, and still more preferably 10 degrees to 35 degrees.

A thickness of the light exit direction restriction layer is preferably greater than or equal to 1.5 mm and less than or equal to 4.0 mm. The thickness is more preferably greater than or equal to 2.0 mm and less than or equal to 4.0 mm and still more preferably greater than or equal to 2.5 mm and less than or equal to 4.0 mm. The light exit direction can be more effectively restricted by increasing the thickness of the light exit direction restriction layer. Meanwhile, in a case where the thickness of the light exit direction restriction layer is increased, the recording image is likely to be blurred. Accordingly, the light exit direction restriction layer is preferably configured within the above range of thickness. In a case where the light exit direction restriction layer is configured with a plurality of layers, this thickness is a total thickness of the plurality of layers.

The protective layer may not be necessary but is preferably comprised in order to protect the light exit direction restriction layer. The protective layer is not particularly limited, provided that the protective layer is transparent and allows passage of light. For example, a plastic plate configured with acrylic resin, polycarbonate, or vinyl chloride resin can be used as the protective layer.

A thickness of the protective layer is preferably greater than or equal to 0.1 μm and less than or equal to 500 μm. In a case where the thickness of the protective layer is greater than or equal to 0.1 μm, not only an effect of protecting the light exit direction restriction layer but also an effect of preventing moire from standing out is achieved. In addition, an effect of preventing a defect of an image caused based on a defect or a structure of the light exit direction restriction layer from standing out is achieved. In a case where the thickness of the protective layer is less than or equal to 500 μm, blurriness of the recording image can be prevented.

Modification Example of Print Image Processing

In order to print a higher quality image, a predetermined type of image processing may be performed on an exposure image, that is, the image displayed on the exposure display. For example, considering that a difference in density of the recording image is smaller than that of a displaying image, processing of increasing (highlighting) a high-frequency component (edge part) of the displaying image in advance, that is, so-called edge highlighting processing, may be performed. For example, a well-known method such as unsharp mask processing can be employed as the edge highlighting processing.

EXPLANATION OF REFERENCES

1: printer-equipped digital camera
10: camera body
12: imaging lens
14: film lid cover
14a: hinge
16: image displaying display
16a: displaying surface of image displaying display
18: power button
20: film discharge port
42: image sensor
50: film loading chamber
52: film forwarding mechanism
52a: claw
54: film transport mechanism
54A: spreading roller pair
56: exposure display
56a: displaying surface of exposure display
58: exposure liquid crystal display
60: exposure backlight
60a: rod-shaped lamp
60b: light guide plate
62: louver plate
62a: incidence surface of louver plate
62b: exit surface of louver plate
64: light exit direction restriction layer
64a: light blocking portion of light exit direction restriction layer
64b: light transmitting portion of light exit direction restriction layer
64y: first light exit direction restriction layer
64y1: light blocking portion of first light exit direction restriction layer
64y2: light transmitting portion of first light exit direction restriction layer
64x: second light exit direction restriction layer
64x1: light blocking portion of second light exit direction restriction layer
64x2: light transmitting portion of second light exit direction restriction layer
66: protective layer
68: image displaying liquid crystal display
70: image displaying backlight
70a: rod-shaped lamp
70b: light guide plate
72: touch sensor
74: light blocking wall
80: microcomputer
80a: displaying control unit
82: analog signal processing unit
84: digital signal processing unit
86: print image processing unit
88: memory
88a: memory controller
90: displaying controller
90a: image output interface
90b: switch
92: operation unit
100: instant film pack
110: instant film
110a: exposure surface of instant film
110b: observation surface of instant film
112: exposure region comprised on exposure surface
114: pod portion
114a: developing treatment liquid pod
116: trap portion
116a: absorbent material
118: observation region comprised on observation surface
118a: frame
120: case of instant film pack
120a: exposure opening
120b: discharge port
120c: claw opening portion
CB: camera button
F: forwarding direction of instant film
LI: live view image
MB: menu button
P: pixel
PB: playback button
PI: playback image
PrB: print button
SB: shutter button

What is claimed is:

1. A printer-equipped digital camera comprising:
an instant film pack loader configured to load therein an instant film pack including an exposure opening;
a first display including a liquid crystal display having a backlight and a displaying surface arranged to face an exposure surface of an instant film in the instant film pack through the exposure opening with respect to the instant film pack loaded in the instant film pack loader, the first display being configured to expose the instant film by displaying an image;
a light exit direction restriction member that is included on the displaying surface of the first display and restricts a light exit direction of light from each pixel of the first display to a constant range;
an imager configured to electronically capture a subject image;
a second display including a liquid crystal display having a backlight, the second display being configured to display an image to an outside; and
a processor configured to:
control ON and OFF of displaying of the first display and the second display by controlling ON and OFF of the backlight of each of the first display and the second display; and switch OFF displaying of the second display while the instant film is exposed by displaying the image on the first display.

2. The printer-equipped digital camera according to claim 1, wherein the processor is configured to display the same image on the first display and the second display.

3. The printer-equipped digital camera according to claim 1, wherein the first display and the second display are connected to the same image output interface.

4. The printer-equipped digital camera according to claim 1, wherein the processor is configured to:
switch ON the backlight of the first display in a case of exposing the instant film; and
switch ON the backlight of the second display in a case of displaying the image on the second display.

5. The printer-equipped digital camera according to claim 1, wherein the backlight of each of the first display and the second display includes a white light source and a light guide plate.

6. The printer-equipped digital camera according to claim 1, wherein the first display and the second display are arranged to be stacked with a light blocking member interposed between the first display and the second display.

7. The printer-equipped digital camera according to claim 1, wherein the first display and the second display are arranged with the instant film pack interposed between the first display and the second display.

8. The printer-equipped digital camera according to claim 1, wherein the processor is further configured to process the image to be displayed on the first display.

9. The printer-equipped digital camera according to claim 8, wherein the processor is configured to perform inversion processing.

10. The printer-equipped digital camera according to claim 8, wherein the processor is configured to perform edge highlighting processing.

11. The printer-equipped digital camera according to claim 1, wherein the light exit direction restriction member is configured with a louver plate that is included on the displaying surface of the first display.

12. The printer-equipped digital camera according to claim 1, wherein the processor is further configured to:
control ON and OFF of the imager; and
switch OFF the imager during displaying of the image on the first display.

13. The printer-equipped digital camera according to claim 1, further comprising:
a touch operation detector configured to detect a touch operation performed on a displaying surface of the second display.

14. A printer-equipped digital camera comprising:
an instant film pack loader configured to load therein an instant film pack including an exposure opening;
a first display having a displaying surface arranged to face an exposure surface of an instant film in the instant film pack through the exposure opening with respect to the instant film pack loaded in the instant film pack loader, the first display being configured to expose the instant film by displaying an image;
a light exit direction restriction member that is included on the displaying surface of the first display and restricts a light exit direction of light from each pixel of the first display to a constant range;
an imager configured to electronically capture a subject image;
a second display configured to display an image to an outside; and
a processor configured to:
control displaying of the first display and the second display;
switch OFF displaying of the second display while the instant film is exposed by displaying the image on the first display; and
adjust brightness of the second display,
wherein the second display is configured to display the image at brightness set by the processor, and the first display is configured to display the image at constant brightness.

15. The printer-equipped digital camera according to claim 14, wherein the processor is further configured to:
control ON and OFF of the imager; and
switch OFF the imager during displaying of the image on the first display.

16. A printer-equipped digital camera comprising:
an instant film pack loader configured to load therein an instant film pack including an exposure opening;
a first display including an organic EL display having a displaying surface arranged to face an exposure surface of an instant film in the instant film pack through the exposure opening with respect to the instant film pack loaded in the instant film pack loader, the first display being configured to expose the instant film by displaying an image;
a light exit direction restriction member that is included on the displaying surface of the first display and restricts a light exit direction of light from each pixel of the first display to a constant range;
an imager configured to electronically capture a subject image;
a second display including an organic EL display configured to display an image to an outside; and
a processor configured to:
control displaying of the first display and the second display;
switch OFF displaying of the second display while the instant film is exposed by displaying the image on the first display; and
control ON and OFF of displaying of the first display and the second display by controlling ON and OFF of the organic EL display of each of the first display and the second display.

17. The printer-equipped digital camera according to claim 16, wherein the processor is further configured to:
control ON and OFF of the imager; and
switch OFF the imager during displaying of the image on the first display.

18. A displaying control method of a printer-equipped camera including a first display and a second display, the first display including a liquid crystal display having a backlight, a displaying surface, and on the displaying surface, a light exit direction restriction member restricting a light exit direction of light from each pixel to a constant range, the first display being configured to expose a surface of an instant film by displaying an image, the second display including a liquid crystal display having a backlight, the second display being configured to display an image to an outside, the displaying control method comprising:
controlling ON and OFF of displaying of the first display and the second display by controlling ON and OFF of the backlight of each of the first display and the second display; and
switching OFF displaying of the second display while the instant film is exposed by displaying the image on the first display.

19. A printer-equipped digital camera comprising:
an instant film pack loader configured to load therein an instant film pack including an exposure opening;
a first display having a displaying surface arranged to face an exposure surface of an instant film in the instant film pack through the exposure opening with respect to the instant film pack loaded in the instant film pack loader, the first display being configured to expose the instant film by displaying an image;
a light exit direction restriction member that is included on the displaying surface of the first display and restricts a light exit direction of light from each pixel of the first display to a constant range;
an imager configured to electronically capture a subject image;
a second display configured to display an image to an outside; and
a processor configured to:
  control displaying of the first display and the second display; and
  switch OFF displaying of the second display before controlling the first display to expose the instant film, then switch ON displaying of the first display to start to expose the instant film by displaying the image, then switch OFF displaying of the first display to finish exposing the instant film, and then switch ON displaying of the second display.

20. The printer-equipped digital camera according to claim 19, wherein the processor is configured to:
  switch OFF displaying of the second display before controlling the first display to expose the instant film;
  after an elapse of a first time period after switching OFF displaying of the second display, switch ON displaying of the first display to start to expose the instant film by displaying the image;
  then switch OFF displaying of the first display to finish exposing the instant film; and
  after an elapse of a second time period after switching OFF displaying of the first display, switch ON displaying of the second display.

21. A displaying control method of a printer-equipped camera including a first display and a second display, the first display having a displaying surface, and on the displaying surface, a light exit direction restriction member restricting a light exit direction of light from each pixel to a constant range, the first display being configured to expose a surface of an instant film by displaying an image, the second display being configured to display an image to an outside, the displaying control method comprising:
  switching OFF displaying of the second display before controlling the first display to expose the instant film;
  then switching ON displaying of the first display to start to expose the instant film by displaying the image;
  then switching OFF displaying of the first display to finish exposing the instant film; and
  then switching ON displaying of the second display.

22. The displaying control method according to claim 21, comprising:
  switching OFF displaying of the second display before controlling the first display to expose the instant film;
  after an elapse of a first time period after switching OFF displaying of the second display, switching ON displaying of the first display to start to expose the instant film by displaying the image;
  then switching OFF displaying of the first display to finish exposing the instant film; and
  after an elapse of a second time period after switching OFF displaying of the first display, switching ON displaying of the second display.

* * * * *